(12) United States Patent
Yin et al.

(10) Patent No.: US 12,126,892 B2
(45) Date of Patent: Oct. 22, 2024

(54) PHOTOGRAPHING METHOD AND ELECTRONIC DEVICE WITH A VIRTUAL SHUTTER BUTTON

(71) Applicant: Huawei Technologies Co., Ltd., Guangdong (CN)

(72) Inventors: Jie Yin, Shanghai (CN); Jiangzhen Zheng, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 146 days.

(21) Appl. No.: 17/640,265

(22) PCT Filed: Jul. 16, 2020

(86) PCT No.: PCT/CN2020/102244
§ 371 (c)(1),
(2) Date: Mar. 3, 2022

(87) PCT Pub. No.: WO2021/042878
PCT Pub. Date: Mar. 11, 2021

(65) Prior Publication Data
US 2022/0311931 A1      Sep. 29, 2022

(30) Foreign Application Priority Data
Sep. 5, 2019   (CN) .......................... 201910836271.3

(51) Int. Cl.
*H04N 23/62*      (2023.01)
*H04N 23/63*      (2023.01)

(52) U.S. Cl.
CPC ........... *H04N 23/62* (2023.01); *H04N 23/633* (2023.01)

(58) Field of Classification Search
CPC .... H04N 23/62; H04N 23/633; H04N 23/631; G06F 1/1652; G06F 1/1686;
(Continued)

(56) References Cited

U.S. PATENT DOCUMENTS 11,099,650 B1 *   8/2021   Haynold ................. G06F 3/016
2013/0208163 A1   8/2013   Choi et al.
(Continued)

FOREIGN PATENT DOCUMENTS

CN      201491132 U     5/2010
CN      104298449 A     1/2015
(Continued)

*Primary Examiner* — Padma Haliyur
(74) *Attorney, Agent, or Firm* — WOMBLE BOND DICKINSON (US) LLP

(57) ABSTRACT

This application provides a photographing method and an electronic device. In the photographing method, a virtual shutter button provided on a photographing preview interface can trigger a photographing or video recording function by when tapped by a user. The virtual shutter button has a same function as a shutter button of a camera application. When the user uses the photographing function of the electronic device, the virtual shutter button may move on the photographing preview interface based on a touch input of the user, thereby improving photographing experience of the user. In addition, the user may complete a photographing operation by touching and tapping the virtual shutter button, and therefore, shake caused by taking a photo by pressing a mechanical button (for example, a volume button) is avoided, and quality of a captured photo is ensured.

18 Claims, 32 Drawing Sheets

(58) Field of Classification Search
CPC ............. G06F 3/04847; G06F 3/04883; G06F 3/04886; G06F 1/1626
See application file for complete search history.

(56) References Cited

U.S. PATENT DOCUMENTS

| | | |
|---|---|---|
| 2014/0033100 A1 | 1/2014 | Noda et al. |
| 2014/0362274 A1* | 12/2014 | Christie ............... H04N 23/632 715/763 |
| 2015/0334291 A1* | 11/2015 | Cho ................... G06F 3/04883 348/222.1 |
| 2016/0360116 A1* | 12/2016 | Penha ................... G11B 27/34 |
| 2017/0264818 A1 | 9/2017 | Liao |
| 2018/0213143 A1* | 7/2018 | Stricker ................ H04N 23/62 |
| 2020/0053283 A1* | 2/2020 | Li ........................ H04N 23/667 |

FOREIGN PATENT DOCUMENTS

| | | | |
|---|---|---|---|
| CN | 105404453 A | 3/2016 | |
| CN | 107395797 A | 11/2017 | |
| CN | 107509028 A | 12/2017 | |
| CN | 107728923 A | 2/2018 | |
| CN | 108279827 A | 7/2018 | |
| CN | 109155821 A | 1/2019 | |
| CN | 110087001 A | 8/2019 | |
| WO | WO-2018161426 A1 * | 9/2018 | ........ H04M 1/72403 |

\* cited by examiner

1100

```
┌─────────────────────────────────────────────────────────────┐
│  Display a first photographing preview interface, where the first │
│   photographing preview interface includes a first button and a second │
│  button, both the first button and the second button are used to perform a │
│      photographing operation, the first button is displayed at a first preset │         1101
│   position of the first photographing preview interface in a first shape, the │
│     second button is displayed at a second position in a second shape, the │
│     second position is located in an edge region of the first photographing │
│       preview interface, and the second shape is different from the first shape │
└─────────────────────────────────────────────────────────────┘
```

Perform the photographing operation in response to a first input that acts on the second button — 1102

FIG. 11

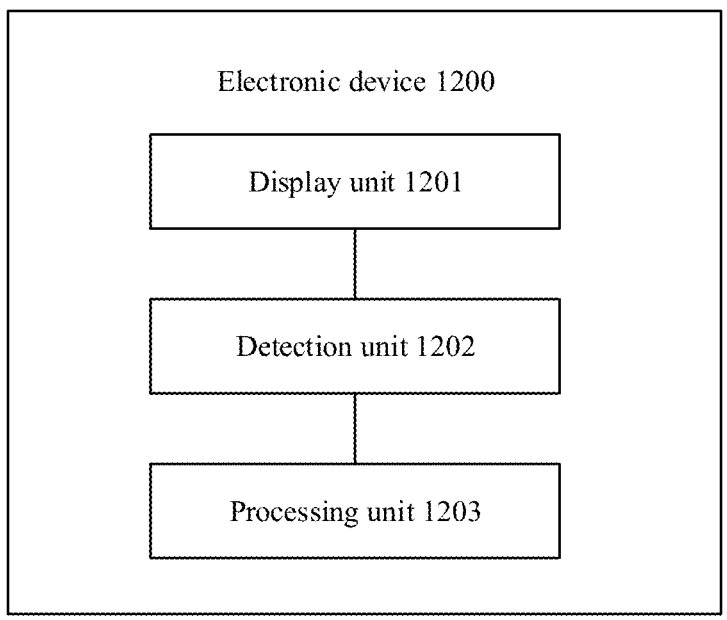

FIG. 12

PHOTOGRAPHING METHOD AND ELECTRONIC DEVICE WITH A VIRTUAL SHUTTER BUTTON

CROSS-REFERENCE TO RELATED APPLICATIONS

This application is a National Stage of International Application No. PCT/CN2020/102244, filed on Jul. 16, 2020, which claims priority to Chinese Patent Application No. 201910836271.3, filed on Sep. 5, 2019. Both of the aforementioned applications are hereby incorporated by reference in their entireties.

TECHNICAL FIELD

This application relates to the field of electronic technologies, and in particular, to a photographing method and an electronic device.

BACKGROUND

In a process of taking a photo by a user, a photo may be obtained by pressing a shutter button of an electronic device, or in a process of recording a video by a user, a video recording function may be enabled by pressing a shutter button of an electronic device. Specifically, a photographing preview interface of a camera application includes the shutter button, and the user may obtain a current photo or enable the video recording function by tapping the shutter button on a display screen of the electronic device. However, in this manner of pressing the shutter button, it is inconvenient for the user to perform an operation with one hand. For example, for a current electronic device with a large screen, the user cannot implement the operation with one hand. In addition, when the user taps the shutter button, a hand is prone to block a preview picture during photographing or video recording, resulting in relatively poor user experience.

SUMMARY

This application provides a photographing method and an electronic device. The photographing method involves a virtual shutter button, and the virtual shutter button may move on a photographing preview interface based on a touch input of a user. In this way, different photographing requirements of the user can be met, thereby improving photographing experience of the user.

According to a first aspect, a photographing method is provided, and is applied to an electronic device. The method includes: displaying a first photographing preview interface, where the first photographing preview interface includes a first button and a second button, both the first button and the second button are used to perform a photographing operation, the first button is displayed at a first preset position of the first photographing preview interface in a first shape, the second button is displayed at a second position in a second shape, the second position is located in an edge region of the first photographing preview interface, and the second shape is different from the first shape; and performing the photographing operation in response to a first input that acts on the second button.

It should be understood that in this application, an "image preview display interface of a camera application" is referred to as a "photographing preview interface". The photographing preview interface may include a region used to present a preview image during photographing, and may further include a plurality of function controls such as a settings menu, a smart visual control, an album shortcut control, a shutter button, a camera switching control, various photographing mode selection controls, and a photographing parameter settings menu. This is not limited in this application.

It should be further understood that the first button may be understood as an original shutter button used for photographing by a mobile phone, and the second button is a virtual shutter button additionally provided on the photographing preview interface. The virtual shutter button may be a virtual shutter button displayed on the photographing preview interface, and the virtual shutter button may have a same function as the original shutter button. In other words, the virtual shutter button may be independent of the shutter button, and a user may implement a photographing or video recording function by touching the virtual shutter button.

In the foregoing technical solution, the virtual shutter button is provided, and the user implements the photographing or video recording function by tapping the virtual shutter button on the photographing preview interface. The virtual shutter button has the same function as the shutter button of the camera application. When the user uses the photographing function of the electronic device, the virtual shutter button may move on the photographing preview interface based on a touch input of the user, thereby improving photographing experience of the user. In addition, the user may complete a photographing operation by touching and tapping the virtual shutter button, and therefore, shake caused by taking a photo by pressing a mechanical button (for example, a volume button) is avoided, and quality of a captured photo is ensured. In this way, different photographing requirements of the user can be met, thereby improving photographing experience of the user.

With reference to the first aspect, in some embodiments of the first aspect, the method further includes: displaying a second photographing preview interface, where the second photographing preview interface includes the first button and the second button, the second button is displayed at a third position in a third shape, and the third position is located in a middle region of the second photographing preview interface; and moving the second button from the third position to the second position in response to a second input that acts on the second button.

It should be understood that the user may change a display position of the virtual shutter button based on different requirements. Specifically, the user may touch the virtual shutter button, and perform a drag operation on the virtual shutter button, and the virtual shutter button on the photographing preview interface of the mobile phone may move along a trajectory of a touch and move operation performed by the user. For example, the user drags the virtual shutter button downwards in a vertical direction of a side edge of a screen of the mobile phone, and in response to the drag operation performed by the user, the virtual shutter button on the photographing preview interface of the mobile phone also moves downwards in the vertical direction of the side edge of the mobile phone. When the user releases a hand, and a finger leaves a touchscreen, the virtual shutter button is displayed and stays at a position of an end point of the trajectory of the touch and move operation performed by the user. The display position of the virtual shutter button is not limited in this application.

In the foregoing solution, a manner of moving the virtual shutter button is provided for the user. When photographing different objects at different angles, the user may move the display position of the virtual shutter button on the photographing preview interface based on different use habits. In this way, different photographing requirements of the user are met, thereby improving photographing experience of the user.

With reference to the first aspect and the foregoing implementations, in some implementations of the first aspect, the third shape is the same as the first shape of the first button.

With reference to the first aspect and the foregoing implementations, in some implementations of the first aspect, the second shape is a long strip shape.

It should be understood that a display shape of the virtual shutter button may be the same as a shape of the shutter button. For example, both the virtual shutter button and the shutter button are in a circular shape presented by the shutter button. Alternatively, a display shape may be different from a shape of the shutter button. For example, the virtual shutter button may be in a long strip shape (rectangular shape). Alternatively, the virtual shutter button may be displayed in different shapes such as a triangle, an arc shape, or a dotted line. This is not limited in this application.

In an embodiment, the virtual shutter button may be displayed as a transparent floating button, a greyscale floating button, or a dynamically displayed button, for example, in a flashing state. A color, transparency, and a display effect of the virtual shutter button are not limited in this application.

In an embodiment, the virtual shutter button may be displayed at any position of the photographing preview interface. For example, the virtual shutter button may be attached to the side edge of the touchscreen or a top or bottom end of the touchscreen. The display position of the virtual shutter button is not limited in this application.

With reference to the first aspect and the foregoing implementations, in some implementations of the first aspect, when the second button is displayed at the second position, the second button is moved from the second position to a fourth position in response to a third input that acts on the second button, where when the fourth position is located in the edge region of the first photographing preview interface, the second button is in the second shape; or when the fourth position is located in the middle region of the second photographing preview interface, the second button is in the third shape.

The virtual shutter button provided in this application may be displayed in different shapes, for example, a rectangular control or a circular control similar to the shutter button, and may be in different colors, for example, in a transparent floating state. In a process of dragging the virtual shutter button by the user, the virtual shutter button may be displayed in different forms. For example, in the process of dragging the virtual shutter button by the user, a display form of the virtual shutter button may be the same as a display form that exists when the virtual shutter button is static at a specific position in an edge region of the photographing preview interface of the electronic device, and the virtual shutter button is displayed in the long strip shape in either of cases.

With reference to the first aspect and the foregoing implementations, in some implementations of the first aspect, the method further includes: displaying a third photographing preview interface in response to a fourth input that acts on the second button, where the third photographing preview interface does not include the second button.

It should be understood that the fourth input may be understood as an operation of disabling the virtual shutter button. Correspondingly, based on different use requirements, the user may disable the virtual shutter button based on a method for enabling the virtual shutter button, so that the virtual shutter button is no longer displayed on the photographing preview interface.

For example, when the user displays the virtual shutter button on the photographing preview interface by invoking the virtual shutter button by using the settings menu, the user may correspondingly disable a "floating photographing button" function in the settings menu, and slide the "floating photographing button" to an "off" state.

Alternatively, when the user invokes, by performing a preset operation, the virtual shutter button provided in this application, the user may correspondingly continue to disable the virtual shutter button by performing the same preset operation.

Alternatively, if the mobile phone displays the virtual shutter button on the photographing preview interface when a front-facing camera is currently turned on, when the user performs switching to a rear-facing camera, the mobile phone automatically disables the virtual shutter button.

Alternatively, the user may press and hold the virtual shutter button, and when the user presses and holds the virtual shutter button for preset duration, the virtual shutter button disappears. Alternatively, when the user presses the virtual shutter button with specific force, the virtual shutter button disappears. Alternatively, when the user presses and holds the virtual shutter button or presses the virtual shutter button with force, a "delete" menu pops up, and the virtual shutter button is disabled by tapping the "delete" menu. It should be understood that a manner of disabling the virtual shutter button is not limited in this application.

With reference to the first aspect and the foregoing implementations, in some implementations of the first aspect, before the displaying a first photographing preview interface, the method further includes: displaying the third photographing preview interface, where the third photographing preview interface includes the first button and does not include the second button; and displaying the second button on the third photographing preview interface in response to a fifth input.

With reference to the first aspect and the foregoing implementations, in some implementations of the first aspect, the fifth input acts on the second button.

For example, the fifth input may be a double-tap operation (for example, a double-tap operation in an edge region of the screen) on the photographing preview interface, a preset gesture performed by the user, an operation performed by using the settings menu, or the like, or may be a touch and/or move operation in an edge region of the screen.

With reference to the first aspect and the foregoing implementations, in some implementations of the first aspect, the method further includes: displaying indication information, where the indication information is used to indicate a function or a position of the second button.

In an embodiment, the indication information may be displayed on the photographing preview interface in a form of an icon, a control, or text information. Alternatively, the indication information may be displayed in a notification bar in a form of text information, and the user may view the indication information by performing a pull-down operation.

For example, the indication information may be displayed on the photographing preview interface in the form of an icon. For example, a control may be presented as an icon in a small triangle shape. When the mobile phone enters the camera application, a reminder control in the small triangle shape is presented on the photographing preview interface. The reminder control may be automatically displayed for specific duration, for example, 5 seconds, after the photographing preview interface is entered. Alternatively, the reminder control may be continuously dynamically displayed, for example, dynamically moves towards the virtual shutter button, for example, moves towards the virtual shutter button for 5 seconds, to remind the user that photographing or video recording may be performed by tapping the virtual shutter button.

Alternatively, for example, a control may be presented as an icon in a camera shape. When the mobile phone enters the camera application, a reminder control in the camera shape is presented on the photographing preview interface. The reminder control may be automatically displayed for specific duration, for example, 5 seconds, after the photographing preview interface is entered. Alternatively, the reminder control may dynamically flash for display, for example, dynamically flash for specific duration or a specific quantity of times. For example, the reminder control flashes for 5 seconds for display or flashes for three times, to remind the user that photographing or video recording may be performed by tapping the virtual shutter button. This is not limited in this application.

Alternatively, the indication information may be displayed on the photographing preview interface in the form of text information. For example, the indication information may include text content, for example, "photo". When the mobile phone enters the camera application, a text reminder box is displayed on the photographing preview interface. The text reminder box may be automatically displayed for specific duration, for example, 5 seconds, after the photographing preview interface is entered. Alternatively, the text reminder box 23 may flash for display, for example, flash for 5 seconds for display or flash for three times, to remind the user that photographing or video recording may be performed by tapping the virtual shutter button.

With reference to the first aspect and the foregoing implementations, in some implementations of the first aspect, the display screen of the electronic device is a curved screen, and the edge region of the first photographing preview interface is a curved bending region of the curved screen; or the display screen of the electronic device is a foldable screen, and the edge region of the first photographing preview interface is a bending region of the foldable screen.

It should be understood that the method may be applied to various types of electronic devices. For example, the method may be applied to an electronic device whose display screen is of a relatively large screen size, for example, a foldable electronic device or an electronic device with a curved screen. When a display screen of the foldable electronic device is expanded, the user faces the display screen with a relatively large screen size, and may complete a photographing operation based on the method provided in this application, by using the virtual shutter button, and by dragging the virtual shutter button to a position convenient for an operation. When the electronic device is a foldable electronic device and in a folded state, when the user takes a selfie, the virtual shutter button may be displayed on a side screen of the foldable electronic device, and the virtual shutter button may be displayed without occupying the photographing preview interface. In an embodiment, the virtual shutter button may be displayed, based on dragging by the user, in a display region, namely, the photographing preview interface, currently used by the user or the edge region of the photographing preview interface, to improve photographing experience of the user. In this way, different photographing requirements of the user can be met, thereby improving photographing experience of the user.

Alternatively, the method may be applied to an electronic device with a curved screen. For the electronic device with a curved screen, the virtual shutter button provided in this application may be located in a curved side region of the curved screen. In this case, for the user, the virtual shutter button is displayed by occupying only the curved side region of the electronic device with a curved screen, and therefore a better image preview effect can be provided for the user. In an embodiment, based on a use habit of the user, the virtual shutter button may be displayed at different positions when being dragged by the user, to improve photographing experience of the user. In this way, different photographing requirements of the user can be met, thereby improving photographing experience of the user.

According to a second aspect, an electronic device is provided, and includes one or more processors, a memory, a plurality of applications, and one or more programs. The one or more programs are stored in the memory. When the one or more programs are executed by the processor, the electronic device is enabled to perform the following operations: displaying a first photographing preview interface, where the first photographing preview interface includes a first button and a second button, both the first button and the second button are used to perform a photographing operation, the first button is displayed at a first preset position of the first photographing preview interface in a first shape, the second button is displayed at a second position in a second shape, the second position is located in an edge region of the first photographing preview interface, and the second shape is different from the first shape; and performing the photographing operation in response to a first input that acts on the second button.

With reference to the second aspect, in some implementations of the second aspect, when the one or more programs are executed by the processor, the electronic device is enabled to perform the following operations: displaying a second photographing preview interface, where the second photographing preview interface includes the first button and the second button, the second button is displayed at a third position in a third shape, and the third position is located in a middle region of the second photographing preview interface; and moving the second button from the third position to the second position in response to a second input that acts on the second button.

With reference to the second aspect and the foregoing implementations, in some implementations of the second aspect, the third shape is the same as the first shape of the first button.

With reference to the second aspect and the foregoing implementations, in some implementations of the second aspect, the second shape is a long strip shape.

With reference to the second aspect and the foregoing implementations, in some implementations of the second aspect, when the one or more programs are executed by the processor, the electronic device is enabled to perform the following operation: when the second button is displayed at the second position, moving the second button from the second position to a fourth position in response to a third input that acts on the second button, where when the fourth position is located in the edge region of the first photographing preview interface, the second button is in the second shape; or when the fourth position is located in the middle region of the second photographing preview interface, the second button is in the third shape.

With reference to the second aspect and the foregoing implementations, in some implementations of the second aspect, when the one or more programs are executed by the processor, the electronic device is enabled to perform the following operation: displaying a third photographing preview interface in response to a fourth input that acts on the second button, where the third photographing preview interface does not include the second button.

With reference to the second aspect and the foregoing implementations, in some implementations of the second aspect, when the one or more programs are executed by the processor, the electronic device is enabled to perform the following operations: Before displaying the first photographing preview interface, the electronic device is further configured to display the third photographing preview interface, where the third photographing preview interface includes the first button and does not include the second button; and displaying the second button on the third photographing preview interface in response to a fifth input.

With reference to the second aspect and the foregoing implementations, in some implementations of the second aspect, the fifth input acts on the second button.

With reference to the second aspect and the foregoing implementations, in some implementations of the second aspect, when the one or more programs are executed by the processor, the electronic device is enabled to perform the following operation: displaying indication information, where the indication information is used to indicate a function or a location of the second button.

With reference to the second aspect and the foregoing implementations, in some implementations of the second aspect, a display screen of the electronic device is a curved screen, and the edge region of the first photographing preview interface is a curved bending region of the curved screen; or a display screen of the electronic device is a foldable screen, and the edge region of the first photographing preview interface is a bending region of the foldable screen.

According to a third aspect, a photographing method is provided, and is applied to an electronic device. The method includes: displaying a first photographing preview interface, where the first photographing preview interface includes a first button and a second button, both the first button and the second button are used to perform a photographing operation, the first button is displayed at a first preset position of the first photographing preview interface in a first shape, the second button is displayed at a second position in a second shape, the second position is located in an edge region of the first photographing preview interface, and the second shape is different from the first shape; and displaying a photographing interface in response to a first input that acts on the second button.

With reference to the third aspect, in some implementations of the third aspect, the method further includes: displaying a second photographing preview interface, where the second photographing preview interface includes the first button and the second button, the second button is displayed at a third position in a third shape, and the third position is located in a middle region of the second photographing preview interface; and displaying the first photographing preview interface in response to a second input that acts on the second button.

With reference to the third aspect and the foregoing implementations, in some implementations of the third aspect, the third shape is the same as the first shape of the first button.

With reference to the third aspect and the foregoing implementations, in some implementations of the third aspect, the second shape is a long strip shape.

With reference to the third aspect and the foregoing implementations, in some implementations of the third aspect, when the second button is displayed at the second position, the first photographing preview interface or the second photographing preview interface is displayed in response to a third input that acts on the second button, where when the electronic device displays the first photographing preview interface, the second button is in the second shape; or when the electronic device displays the second photographing preview interface, the second button is in the third shape.

With reference to the third aspect and the foregoing implementations, in some implementations of the third aspect, the method further includes: displaying a third photographing preview interface in response to a fourth input that acts on the second button, where the third photographing preview interface does not include the second button.

With reference to the third aspect and the foregoing implementations, in some implementations of the third aspect, before the displaying a first photographing preview interface, the method further includes: displaying the third photographing preview interface, where the third photographing preview interface includes the first button and does not include the second button; and displaying the first photographing preview interface or the second photographing preview interface in response to a fifth input.

With reference to the third aspect and the foregoing implementations, in some implementations of the third aspect, the fifth input acts on the second button.

With reference to the third aspect and the foregoing implementations, in some implementations of the third aspect, the method further includes: displaying indication information, where the indication information is used to indicate a function or a position of the second button.

With reference to the third aspect and the foregoing implementations, in some implementations of the third aspect, a display screen of the electronic device is a curved screen, and the edge region of the first photographing preview interface is a curved bending region of the curved screen; or a display screen of the electronic device is a foldable screen, and the edge region of the first photographing preview interface is a bending region of the foldable screen.

According to a fourth aspect, a photographing method is provided, and is applied to an electronic device. The method includes: displaying a first photographing preview interface, where the first photographing preview interface includes a first button and a second button, both the first button and the second button are used to perform a photographing operation, the first button is displayed at a first preset position of the first photographing preview interface in a first shape, the second button is displayed at a second position in a second shape, the second position is located in an edge region of the first photographing preview interface, the second shape is different from the first shape, and the second shape is a long strip shape; moving the second button from the second position to a third position in response to a second input that acts on the second button, where the second button is displayed at the third position in a third shape, the third position is located in a middle region of a second preview image interface, and the third shape is the same as the first shape; performing the photographing operation in response to a first input that acts on the second button; moving the second button from the third position to a fourth position in response to a third input that acts on the second button, where when the fourth position is located in the middle region of the second photographing preview interface, the second button is in the first shape; or when the fourth position is located in the edge region of the first photographing preview interface, the second button is in the second shape; displaying the third photographing preview interface in response to a fourth input that acts on the second button, where the second photographing preview interface does not include the second button; and displaying indication information, where the indication information is used to indicate a function or a position of the second button; and when a display screen of the electronic device is a curved screen, the edge region of the first photographing preview interface is a curved bending region of the curved screen; or when a display screen of the electronic device is a foldable screen, the edge region of the first photographing preview interface is a bending region of the foldable screen.

According to a fifth aspect, this application provides an apparatus. The apparatus is included in an electronic device, and the apparatus has a function of implementing behavior of the electronic device in the foregoing aspects and the embodiments of the foregoing aspects. The function may be implemented by hardware, or may be implemented by corresponding software executed by hardware. The hardware or the software includes one or more modules or units corresponding to the foregoing function, for example, a display module or unit, a detection module or unit, or a processing module or unit.

According to a sixth aspect, this application provides an electronic device, including a touch display screen, where the touch display screen includes a touch-sensitive surface and a display, a camera, one or more processors, one or more memories, a plurality of applications, and one or more computer programs. The one or more computer programs are stored in the memory, and the one or more computer programs include instructions. When the instructions are executed by the one or more processors, the electronic device is enabled to perform the method according to any embodiment of any one of the foregoing aspects.

According to a seventh aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the method according to any embodiment of any one of the foregoing aspects.

According to an eighth aspect, this application provides a computer storage medium, including computer instructions. When the computer instructions are run on an electronic device, the electronic device is enabled to perform the method according to any embodiment of any one of the foregoing aspects.

According to a ninth aspect, this application provides a computer program product. When the computer program product is run on an electronic device, the electronic device is enabled to perform the method according to any embodiment of any one of the foregoing aspects.

BRIEF DESCRIPTION OF DRAWINGS

FIG. 11 is a schematic flowchart of a photographing method according to an embodiment of this application; and FIG. 12 is a schematic diagram of composition of an electronic device according to an embodiment of this application.

DESCRIPTION OF EMBODIMENTS

The following describes the technical solutions in embodiments of this application with reference to the accompanying drawings in the embodiments of this application. In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise stated, "a plurality of" means two or more than two.

A photographing method provided in the embodiments of this application may be applied to an electronic device or an independent application. The application may implement the photographing method in this application. For example, the photographing method may be applied to an electronic device such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the electronic device is not limited in the embodiments of this application.

Figure 1:
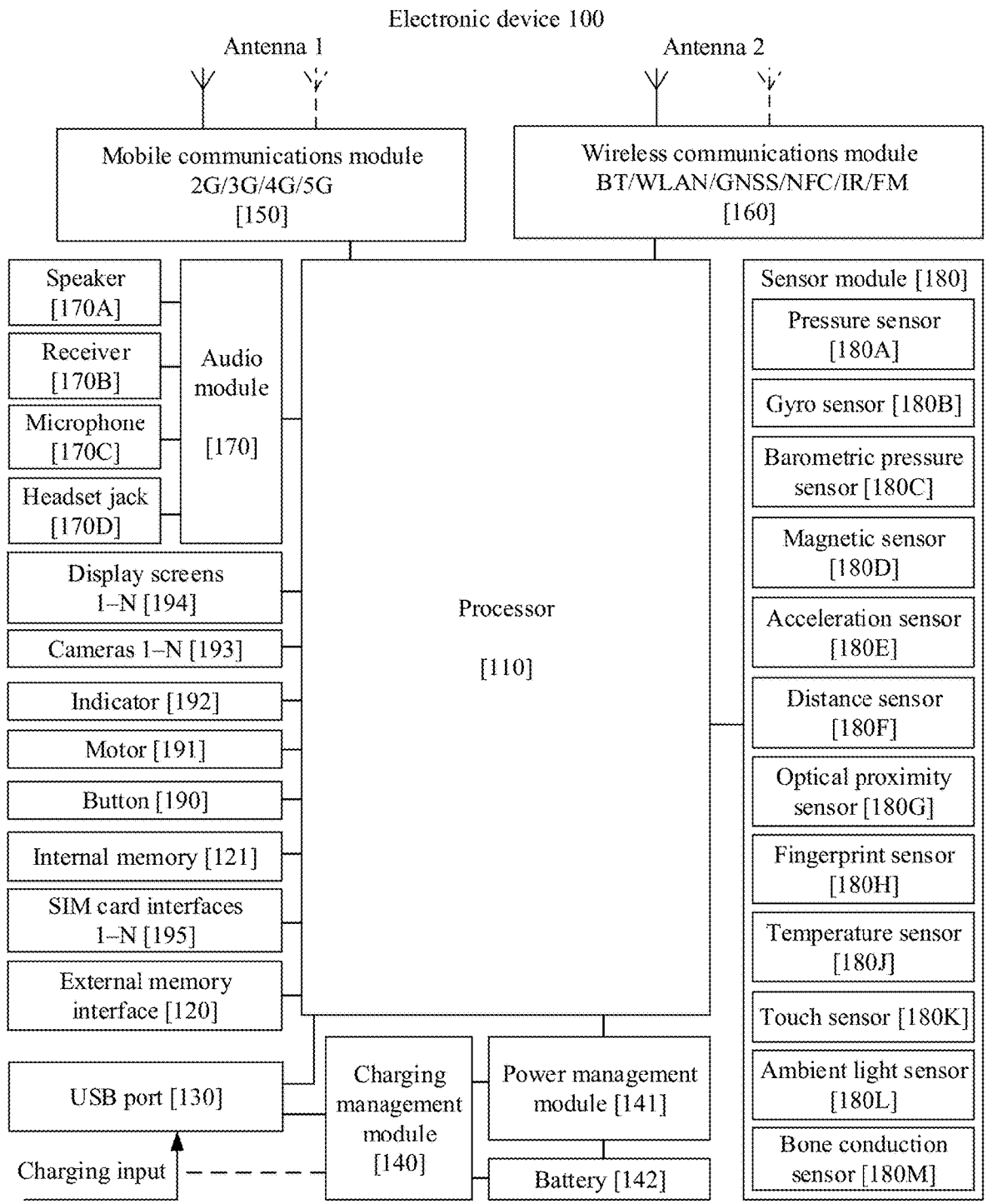
FIG. 1 is a schematic diagram of a structure of an electronic device.

For example, FIG. 1 is a schematic diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a force sensor 180A, a gyroscope sensor 180B, a barometric force sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2S buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to a charger for charging the electronic device 100, may be configured to transmit data between the electronic device 100 and a peripheral device, or may be configured to connect to a headset for playing audio through the headset. Alternatively, the port may be configured to connect to another electronic device, for example, an AR device.

It can be understood that an interface connection relationship between the modules in this embodiment of this application is merely an example for description, and does not constitute a limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive charging input from a charger. The charger may be a wireless charger or a wired charger. In some embodiments of wired charging, the charging management module 140 may receive charging input from the wired charger through the USB port 130. In some embodiments in which wireless charging is used, the charging management module 140 may receive wireless charging input through a wireless charging coil of the electronic device 100. The charging management module 140 may further supply power to the electronic device by using the power management module 141 while charging the battery 142.

The power management module 141 is configured to connect to the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal to an electromagnetic wave for radiation through the antenna 1. In some embodiments, at least some function modules of the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more devices that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

For example, in this application, the electronic device may collect a current to-be-captured picture by using the camera 193, and obtain a photo or a video by tapping a virtual shutter button.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (for example, audio data and an address book) created in a process of using the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mic" or a "sound conducting device", is configured to convert a sound signal into an electrical signal. When making a call or sending a voice message, a user may make a sound near the microphone 170C, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130 or a 3.5 mm open mobile terminal platform (OMTP) standard interface or a cellular telecommunications industry association of the USA (CTIA) standard interface.

The force sensor 180A is configured to sense a force signal, and can convert the force signal into an electrical signal. In some embodiments, the force sensor 180A may be disposed on the display 194. There are a plurality of types of force sensors 180A, for example, a resistive force sensor, an inductive force sensor, and a capacitive force sensor. The capacitive force sensor may include at least two parallel plates made of conductive materials. When a force is applied to the force sensor 180A, capacitance between electrodes changes. The electronic device 100 determines force intensity based on a capacitance change. When a touch operation is performed on the display 194, the electronic device 100 detects intensity of the touch operation by using the force sensor 180A. The electronic device 100 may calculate a touch location based on a detection signal of the force sensor 180A. In some embodiments, touch operations that are performed at a same touch location but have different touch operation intensity may correspond to different operation instructions. For example, when a touch operation whose touch operation intensity is less than a first force threshold is performed on a Messaging icon, an instruction for viewing an SMS message is executed. When a touch operation whose touch operation intensity is greater than or equal to the first force threshold is performed on a Messaging icon, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during photographing. For example, when a shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyroscope sensor 180B may be further used in a navigation scenario and a motion-sensing game scenario.

The barometric force sensor 180C is configured to measure barometric force. In some embodiments, the electronic device 100 calculates an altitude based on a value of the barometric force measured by the barometric force sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a flip phone, the electronic device 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The range sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically perform screen-off to save power. The optical proximity sensor 180G may also be used in a flip cover mode or a pocket mode to automatically unlock or lock a screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed in the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood force beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood force beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
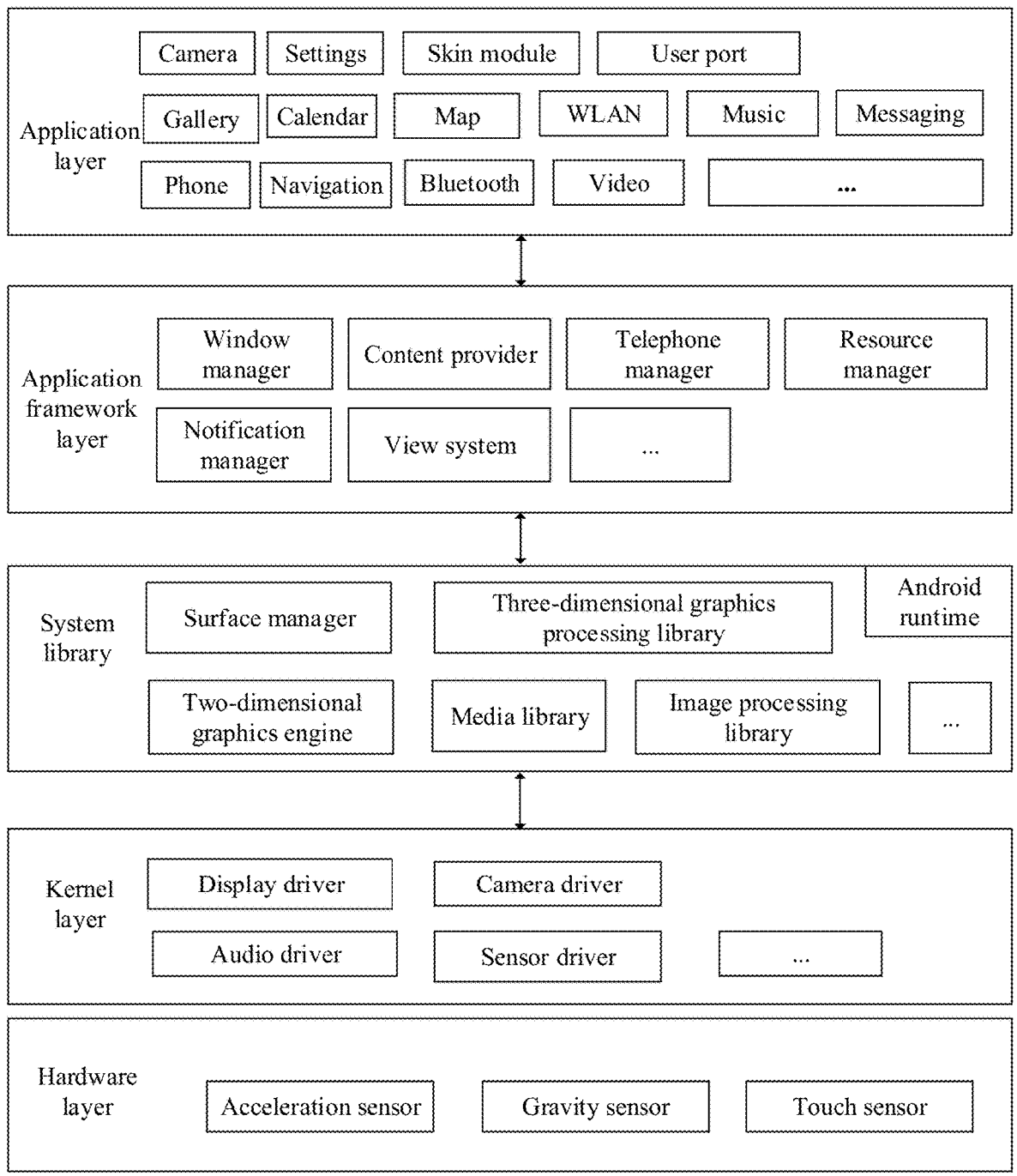
FIG. 2 is a block diagram of a software structure of an electronic device according to an embodiment of this application.

FIG. 2 is a block diagram of a software structure of the electronic device 100 according to an embodiment of this application. In a hierarchical architecture, software is divided into several layers, and each layer has a clear role and task. The layers communicate with each other through a software interface. In some embodiments, the Android system is divided into four layers: an application layer, an application framework layer, an Android runtime and a system library, and a kernel layer from top to bottom. The application layer may include a series of application packages.

As shown in FIG. 2, the application layer may include Camera, Settings, a skin module, a user interface (UI), a third-party application, and the like. The third-party application may include Gallery, Calendar, Phone, Map, Navigation, WLAN, Bluetooth, Music, Video, Messaging, or the like.

The application framework layer provides an application programming interface (API) and a programming framework for an application at the application layer. The application framework layer may include some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and a bookmark, a phone book, and the like.

The view system includes a visual control, for example, a control for displaying text or a control for displaying a picture, for example, indication information used to notify the virtual shutter button in this embodiment of this application. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager, a media library (media library), a three-dimensional graphics processing library (for example, OpenGL ES), a 2D graphics engine (for example, SGL), and the like.

The surface manager is configured to manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include: a status monitoring service module, for example, a physical status recognition module, configured to analyze and recognize a user gesture; and a sensor service module, configured to monitor sensor data uploaded by various types of sensors at the hardware layer, to determine a physical status of the electronic device 100.

The kernel layer is a layer between hardware and software. The kernel layer includes at least a display driver, a camera driver, an audio driver, and a sensor driver.

The hardware layer may include various types of sensors, for example, the various types of sensors described in FIG. 1, the acceleration sensor, the gyroscope sensor, and the touch sensor in this embodiment of this application.

With reference to the electronic devices described in FIG. 1 and FIG. 2, in the embodiments of this application, physical elements related to the electronic device 100 mainly include hardware components such as a sensor, a decision support system (DSS) display chip, a touch display screen, and a fingerprint recognition module; kernel software layers such as a screen management module, a display driver, a fingerprint driver, and accidental touch prevention; application framework layer functions such as accidental touch input prevention, screen control, an always on display (AOD) service, and power management; and application layer services such as an special adaptation application (camera), a third-party application, system hibernation, and AOD.

The following describes working procedures of software and hardware of the electronic device 100 by using an example and with reference to a photographing method in the embodiments of this application. The photographing method provided in the embodiments of this application is mainly implemented through mutual cooperation between a touch panel (TP) module, one or more of the foregoing physical elements, and software architecture layers of the electronic device 100.

The TP module receives a touch operation performed by a user on the touch display screen, and transfers the touch operation performed by the user to a physical status recognition module in the system library. A physical status monitoring module performs monitoring, recognizes the touch operation performed by the user, and so on. The physical status monitoring module transfers the touch operation performed by the user to a state machine management module of the electronic device, and controls a window management system at an FWK layer by using the state machine management module, to control a series of actions, display, and the like of the electronic device.

In addition, implementation of the entire process further requires collaborative participation of a plurality of other modules and sensors, for example, a skin module at an application layer. The skin module is configured to control a display interface of a touchscreen and the like. Details are not described in this application.

For ease of understanding, in the following embodiments of this application, with reference to the accompanying drawings and application scenarios, an electronic device having the structures shown in FIG. 1 and FIG. 2 is used as an example to describe in detail the photographing method provided in the embodiments of this application.

For a current electronic device, in a process of taking a photo by a user, a photo is obtained or a video recording function is enabled by pressing a shutter button. In a process of pressing the shutter button, there may be different manners. In an implementation, a photographing preview interface of a camera application includes the shutter button. Herein, it should be noted that in this application, a region of a display interface that exists after the camera application is entered is referred to as the "photographing preview interface". The photographing preview interface may include a region used to present a preview image during photographing, and may further include regions in which menu options such as an album, the shutter button, and a camera switching control are located. The user may obtain a photo or enable the video recording function by tapping the shutter button on the photographing preview interface. However, in this manner of pressing the shutter button, it is inconvenient for the user to perform an operation with one hand. For example, for an electronic device with a relatively large screen size, it is inconvenient for the user to perform the operation with one hand. In addition, when the user taps the shutter button, a hand of the user is prone to block a preview picture during photographing or video recording, resulting in relatively poor user experience.

Figure 3A:
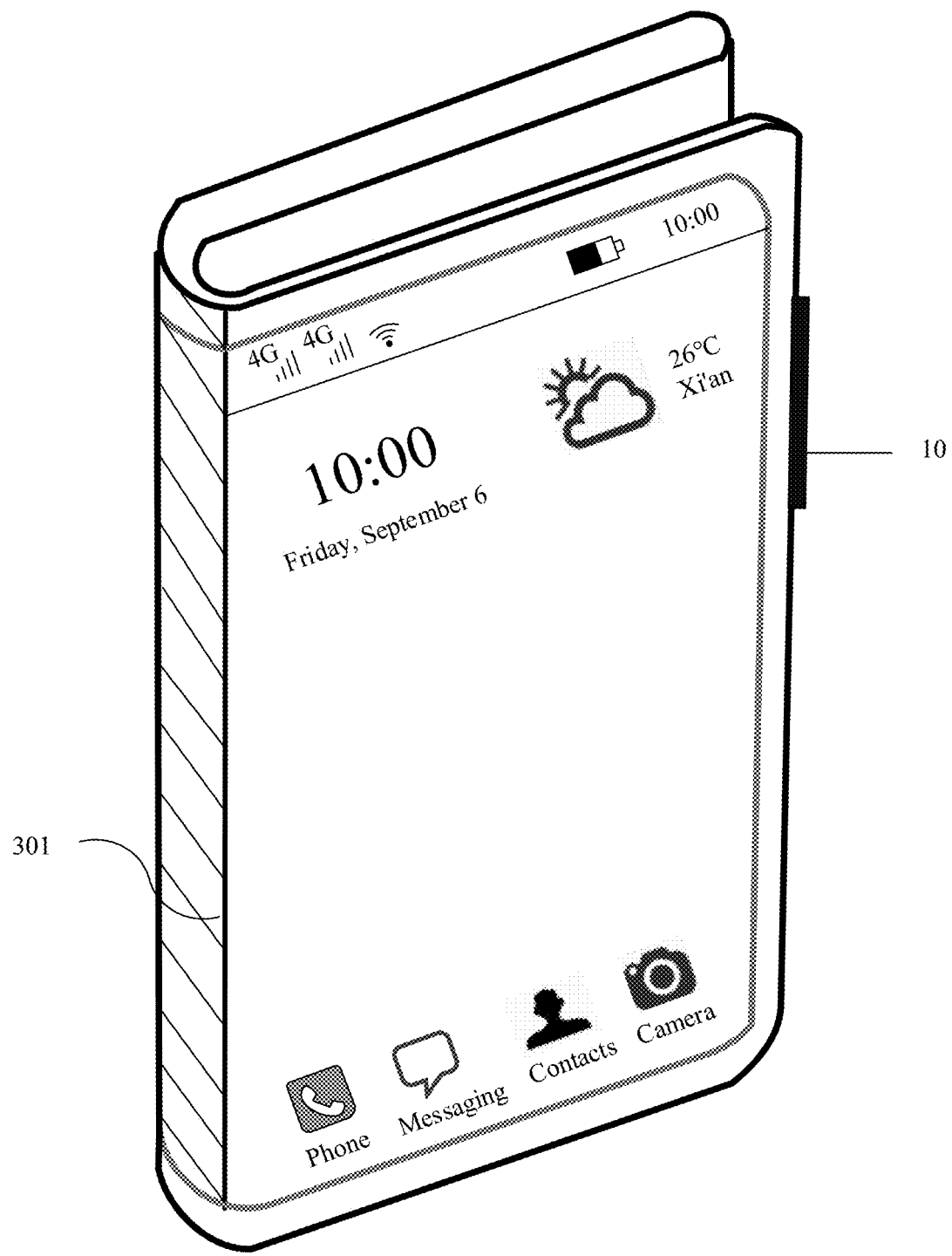
FIG. 3(a) and FIG. 3(b) are a schematic diagram of an electronic device according to an embodiment of this application.
Figure 3B:
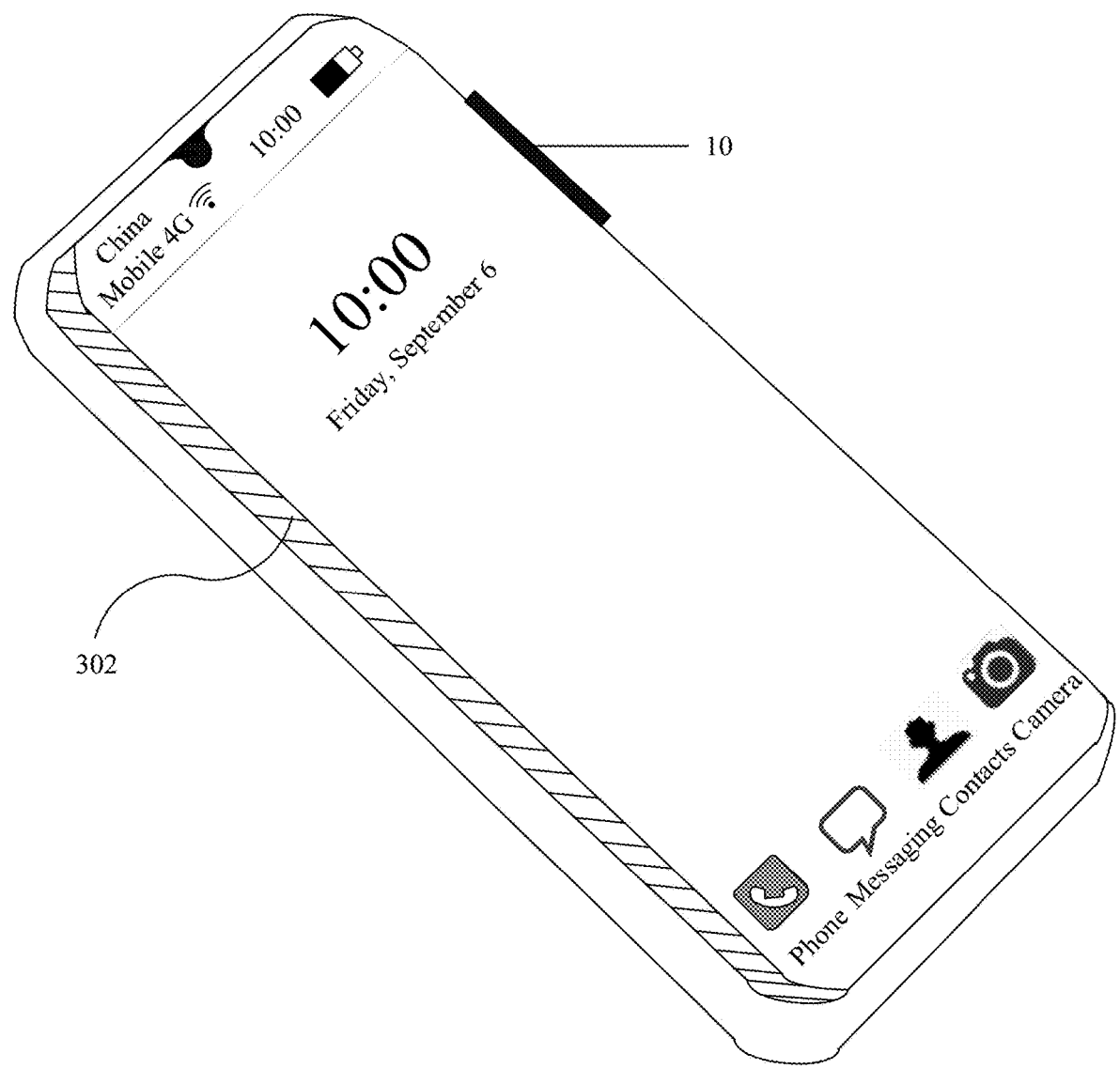

In another implementation, the user may perform photographing by pressing a volume button of the electronic device. For example, FIG. 3(a) and FIG. 3(b) are a schematic diagram of an electronic device according to an embodiment of this application. FIG. 3(a) is a schematic diagram of a foldable electronic device in a folded state. A shadow region 301 is a side screen of the foldable electronic device. FIG. 3(b) is a schematic diagram of an electronic device with a curved screen. A shadow region 302 is a curved screen region of the electronic device. Each of the electronic devices in FIG. 3(a) and FIG. 3(b) is provided with a button 10. The button 10 corresponds to the button 190 described in FIG. 1. The button 10 may be a volume button of the foldable electronic device or the electronic device with a curved screen. In this manner of pressing the shutter button by pressing the volume button 10, the electronic device is prone to shake, which affects quality of an obtained photo. In addition, the button 10 is a mechanical button, and is fixedly located on the electronic device. When the user changes a photographing angle or adjusts a position of the electronic device, there may be inconvenience to current photographing performed by the user, resulting in relatively poor user experience.

In addition to implementing a photographing or video recording function by using a button, the user may implement the photographing or video recording function by controlling the electronic device by using a voice, and so on. For example, after the electronic device starts a voice assistant, the user may send a voice instruction, for example, "little E, little E, start to taking a photo". The electronic device obtains and recognizes the voice instruction, invokes the corresponding camera application, takes a photo, and stores a photo in a local album, to complete the photographing function. This method for controlling photographing by using a voice instruction poses a requirement on a photographing environment. For example, in some relatively noisy environments, there is a low rate of recognizing the voice instruction from the user by the electronic device, and consequently a photographing operation is affected. In addition, in a usage scenario in which the user takes a selfie, in a process of controlling photographing by using a voice instruction, a corresponding mouth shape of sending the voice instruction by the user is also captured, and photographing experience of the user is affected if photographing is controlled by using a voice instruction in public.

Therefore, this application provides a photographing method, to improve photographing experience of a user without affecting a photographing preview interface. The photographing method provided in this application is described below with reference to the accompanying drawings.

Figure 4A:
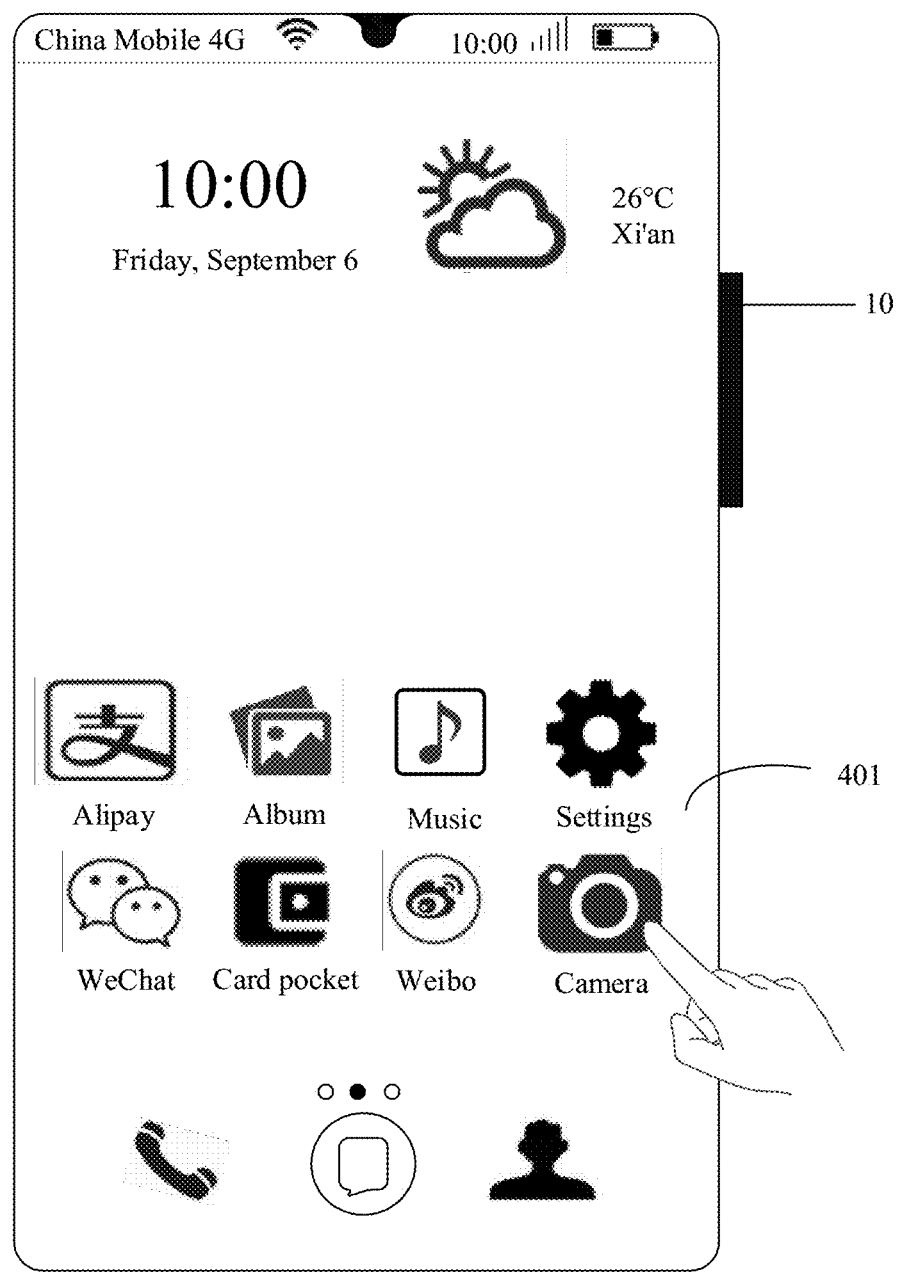
FIG. 4(a), FIG. 4(b), FIG. 4(c), FIG. 4(d), and FIG. 4(e) are a schematic diagram of a graphical user interface of a first electronic device according to an embodiment of this application.

FIG. 4(a), FIG. 4(b), FIG. 4(c), FIG. 4(d), and FIG. 4(e) are a schematic diagram of a graphical user interface (GUI) of a first electronic device according to an embodiment of this application. In this application, the photographing method provided in this application is described in detail by using a mobile phone as the electronic device. It is shown in FIG. 4(a) that in an unlock mode of the mobile phone, a screen display system of the mobile phone displays currently output interface content 401. The interface content 401 is a home screen of the mobile phone. A plurality of third-party applications (App) such as Alipay, Album, Music, Settings, WeChat, Card pocket, Weibo, and Camera are displayed on the interface content 401. It should be understood that the interface content 401 may further include more applications. This is not limited in this application.

Figure 4B:
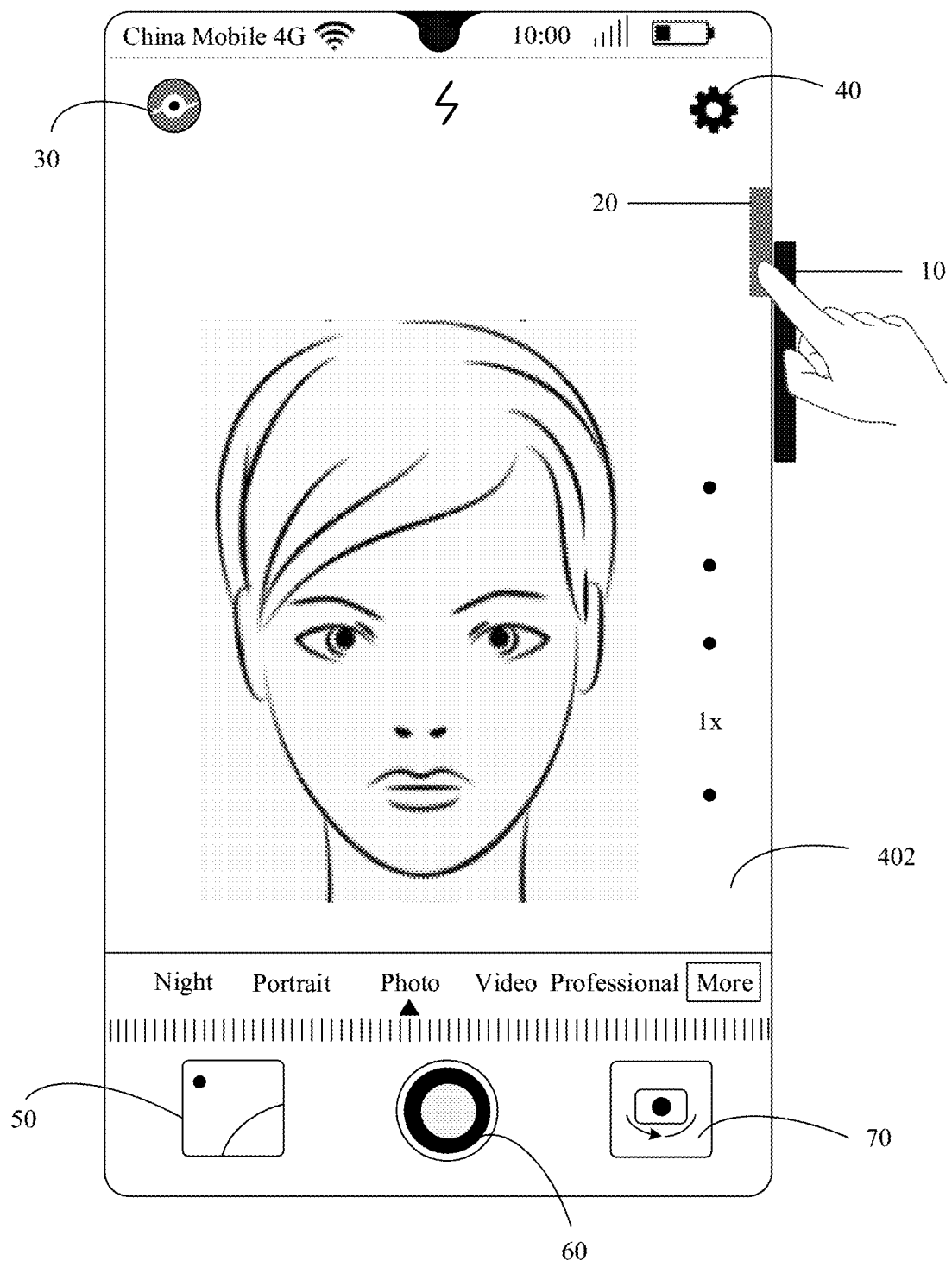

A tap operation shown in FIG. 4(a) is performed on an icon of the "camera" application, and in response to the tap operation, the mobile phone enters an image preview display interface, of the camera application, shown in FIG. 4(b). In this application, the "image preview display interface of the camera application" is referred to as a "photographing preview interface". The photographing preview interface 402 may include a region used to present a preview image during photographing, and may further include a plurality of function controls such as a settings menu 40, a smart visual control 30, an album shortcut control 50, a shutter button 60, a camera switching control 70, various photographing mode selection controls, and a photographing parameter settings menu shown in FIG. 4(b). Details are not described herein.

In this application, a virtual shutter button 20 is additionally provided on the photographing preview interface 402. The virtual shutter button 20 may be a virtual shutter button displayed on the photographing preview interface 402, and the virtual shutter button may have a same function as the shutter button 60. In other words, the virtual shutter button 20 may be independent of the shutter button 60, and a user may implement a photographing or video recording function by touching the virtual shutter button 20.

In an embodiment, the virtual shutter button 20 may be directly displayed on the photographing preview interface 402, and a display shape may be the same as a shape of the shutter button 60. For example, both the virtual shutter button 20 and the shutter button 60 are in a circular shape shown by the shutter button 60. Alternatively, a display shape may be different from a shape of the shutter button 60. For example, the virtual shutter button 20 may be in a long strip shape (rectangular shape). Alternatively, the virtual shutter button 20 may be displayed in different shapes such as a triangle, an arc shape, or a dotted line. This is not limited in this application.

In an embodiment, the virtual shutter button 20 may be displayed as a transparent floating button, a greyscale floating button, or a dynamically displayed button, for example, in a flashing state. A color, transparency, and a display effect of the virtual shutter button 20 are not limited in this application.

In an embodiment, the virtual shutter button 20 may be displayed at any position of the photographing preview interface. For example, the virtual shutter button 20 may be attached to a side edge of a touchscreen or a top or bottom end of a touchscreen. A display position of the virtual shutter button 20 is not limited in this application.

In implementation embodiment, when the mobile phone enables the photographing function to display the photographing preview interface 402, the virtual shutter button 20 may be automatically displayed on the photographing preview interface 402.

It should be understood that in this application, that the mobile phone enables the photographing function may mean that the mobile phone enters the camera application to enable the photographing function, to display the photographing preview interface, or may mean that the mobile phone enables the photographing function by using another third-party application, to display the photographing preview interface. For example, the photographing function is enabled in a chat window of the WeChat application, to display the photographing preview interface, or the photographing function is enabled in BeautyCam, to display the photographing preview interface. Regardless of whether the photographing function is enabled by using the camera application or the another third-party application, refer to the photographing method provided in this application. In this application, description is provided by using an example in which the photographing function is enabled in the camera application, to display the photographing preview interface. This is not limited in this application.

In an embodiment, the virtual shutter button 20 may float at a position in an upper right corner or an upper left corner of the photographing preview interface 402 for display. For example, as shown in FIG. 4(b), the virtual shutter button 20 is located at a position, close to a volume button 10, of the photographing preview interface 402.

In an embodiment, when the mobile phone enables the photographing function to display the photographing preview interface 402, the photographing preview interface 402 further includes indication information.

In an embodiment, the indication information may be displayed on the photographing preview interface in a form of an icon, a control, or text information. Alternatively, the indication information may be displayed in a notification bar in a form of text information, and the user may view the indication information by performing a pull-down operation.

Figure 4C:
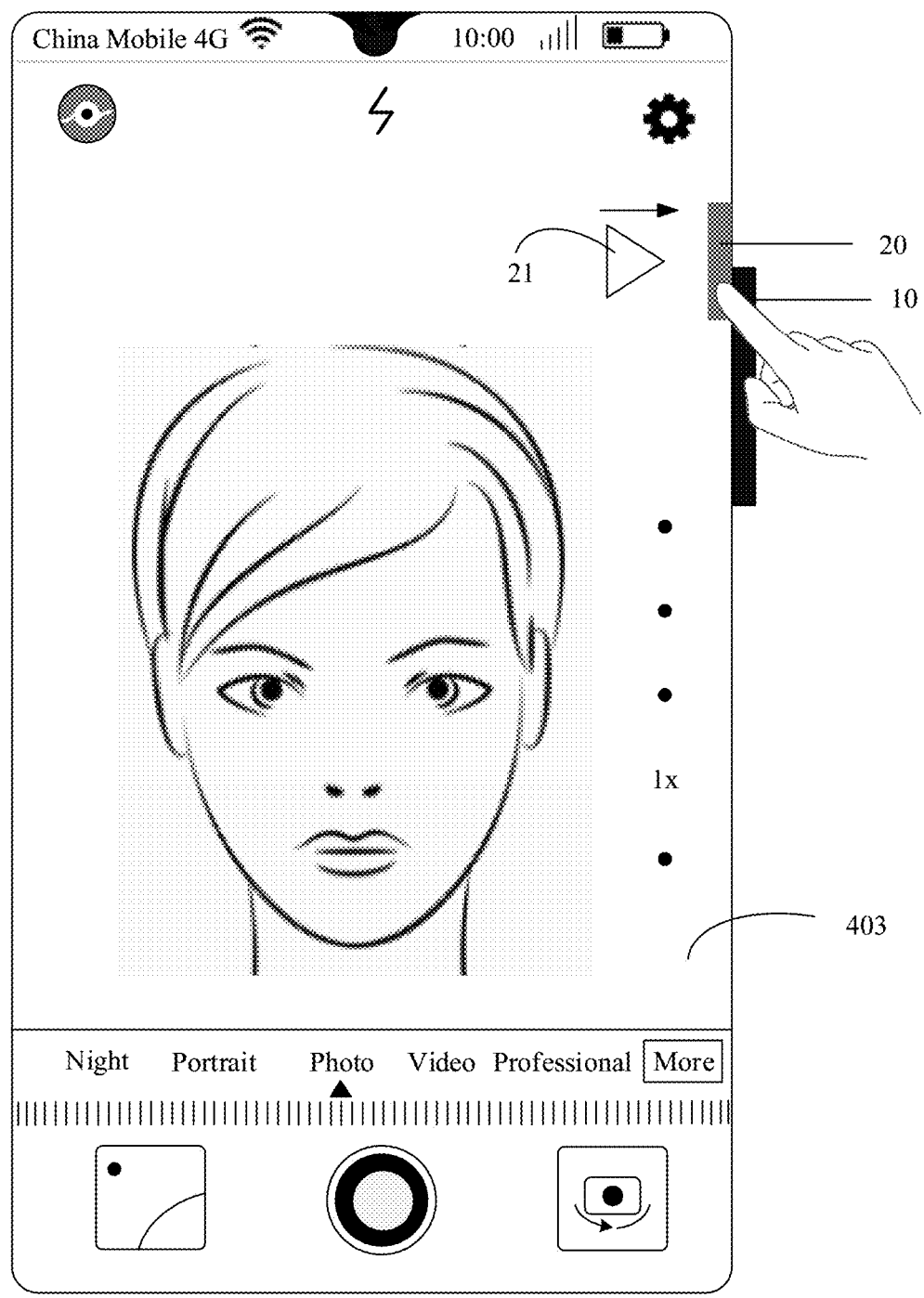

For example, the indication information may be displayed on the photographing preview interface in the form of an icon. As shown in FIG. 4(c), a control 21 may be presented as an icon in a small triangle shape. When the mobile phone enters the camera application, a reminder control 21 in the small triangle shape is presented on a photographing preview interface 403. The reminder control 21 may be automatically displayed for specific duration, for example, 5 seconds, after the photographing preview interface is entered. Alternatively, the reminder control 21 may be continuously dynamically displayed, for example, dynamically moves towards the virtual shutter button 20 in a direction indicated by an arrow in FIG. 4(c), for example, moves towards the virtual shutter button 20 for 5 seconds, to remind the user that photographing or video recording may be performed by tapping the virtual shutter button 20.

Figure 4D:
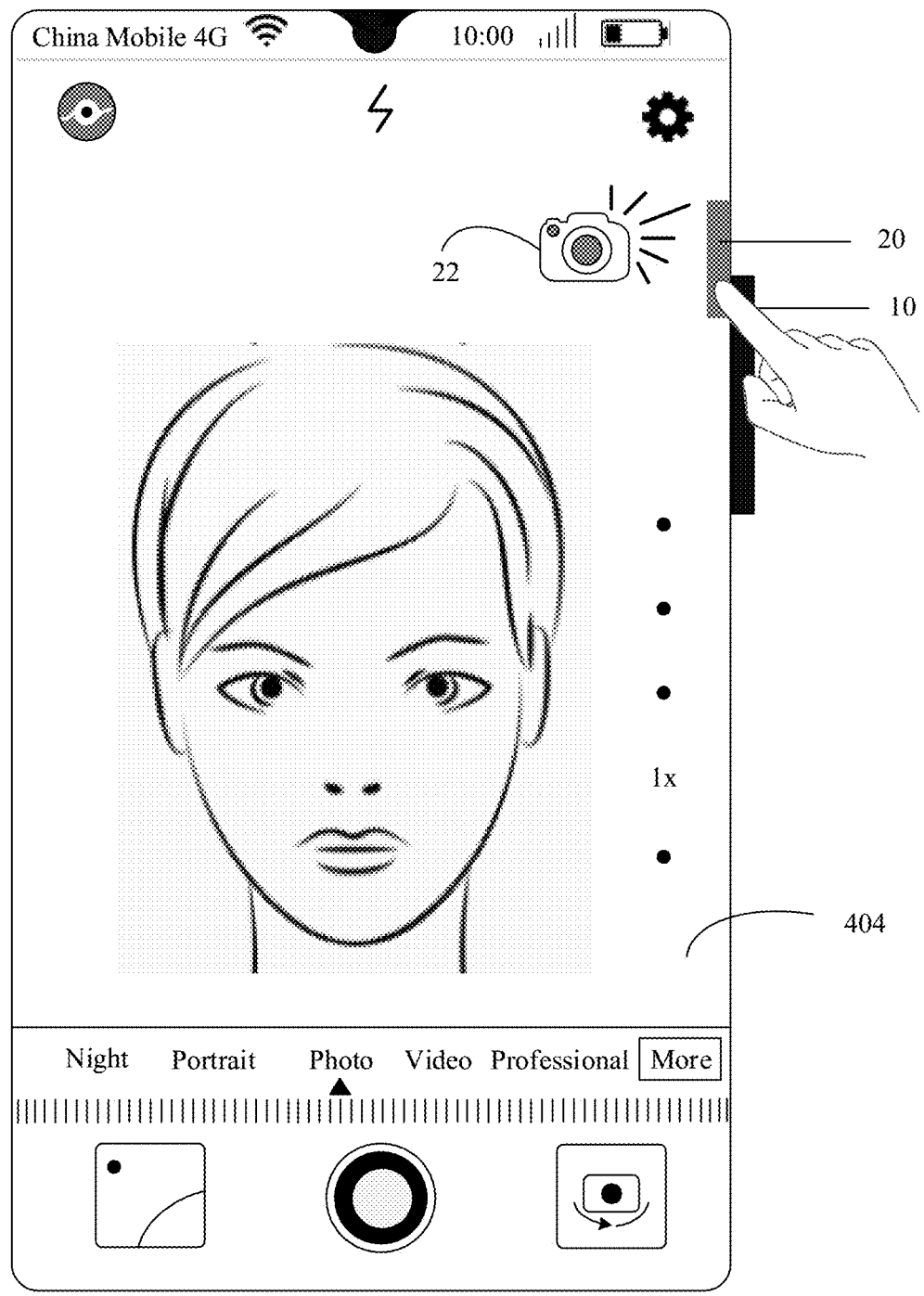

Alternatively, for example, as shown in FIG. 4(d), a control 21 may be presented as an icon in a camera shape. When the mobile phone enters the camera application, a reminder control 22 in the camera shape is presented on a photographing preview interface 404. The reminder control 22 may be automatically displayed for specific duration, for example, 5 seconds, after the photographing preview interface is entered. Alternatively, the reminder control 21 may dynamically flash for display, for example, dynamically flash for specific duration or a specific quantity of times in a form of the icon shown in FIG. 4(d). For example, the reminder control 22 flashes for 5 seconds for display or flashes for three times, to remind the user that photographing or video recording may be performed by tapping the virtual shutter button 20. This is not limited in this application.

Figure 4E:
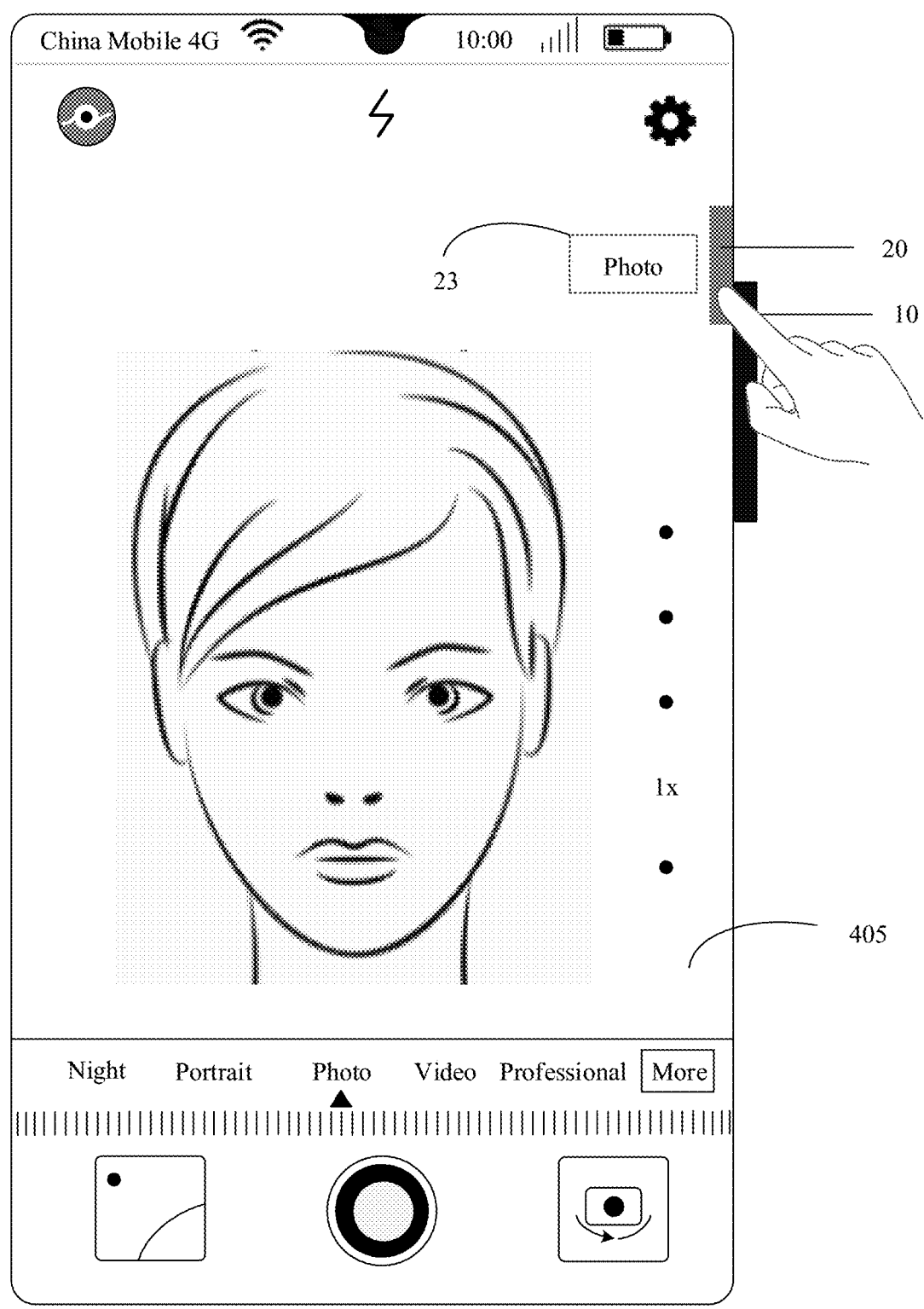

Alternatively, the indication information may be displayed on the photographing preview interface in the form of text information. As shown in FIG. 4(e), the indication information may include text content, for example, "photo". When the mobile phone enters the camera application, a text reminder box 23 is displayed on a photographing preview interface 405. The text reminder box 23 may be automatically displayed for specific duration, for example, 5 seconds, after the photographing preview interface is entered. Alternatively, the text reminder box 23 may flash for display, for example, flash for 5 seconds for display or flash for three times, to remind the user that photographing or video recording may be performed by tapping the virtual shutter button 20.

It should be understood that the virtual shutter button 20 newly added to the photographing preview interface is described above with reference to FIG. 4(a), FIG. 4(b), FIG. 4(c), FIG. 4(d), and FIG. 4(e). The virtual shutter button 20 may be displayed at any position of the photographing preview interface. A position and display duration of the virtual shutter button 20 on the photographing preview interface are not limited in this application. In addition, it is described in FIG. 4(c), FIG. 4(d), and FIG. 4(e) that the photographing preview interface may further include the indication information used to remind the user of the virtual shutter button 20. A display manner (for example, an icon shape or display duration) of the indication information is not limited in this application.

In an embodiment, when the mobile phone enables the photographing function to display the photographing preview interface 402, the virtual shutter button 20 is not directly displayed on the photographing preview interface, and may be displayed on the photographing preview interface after setting or invoking is performed by the user.

Figure 5A:
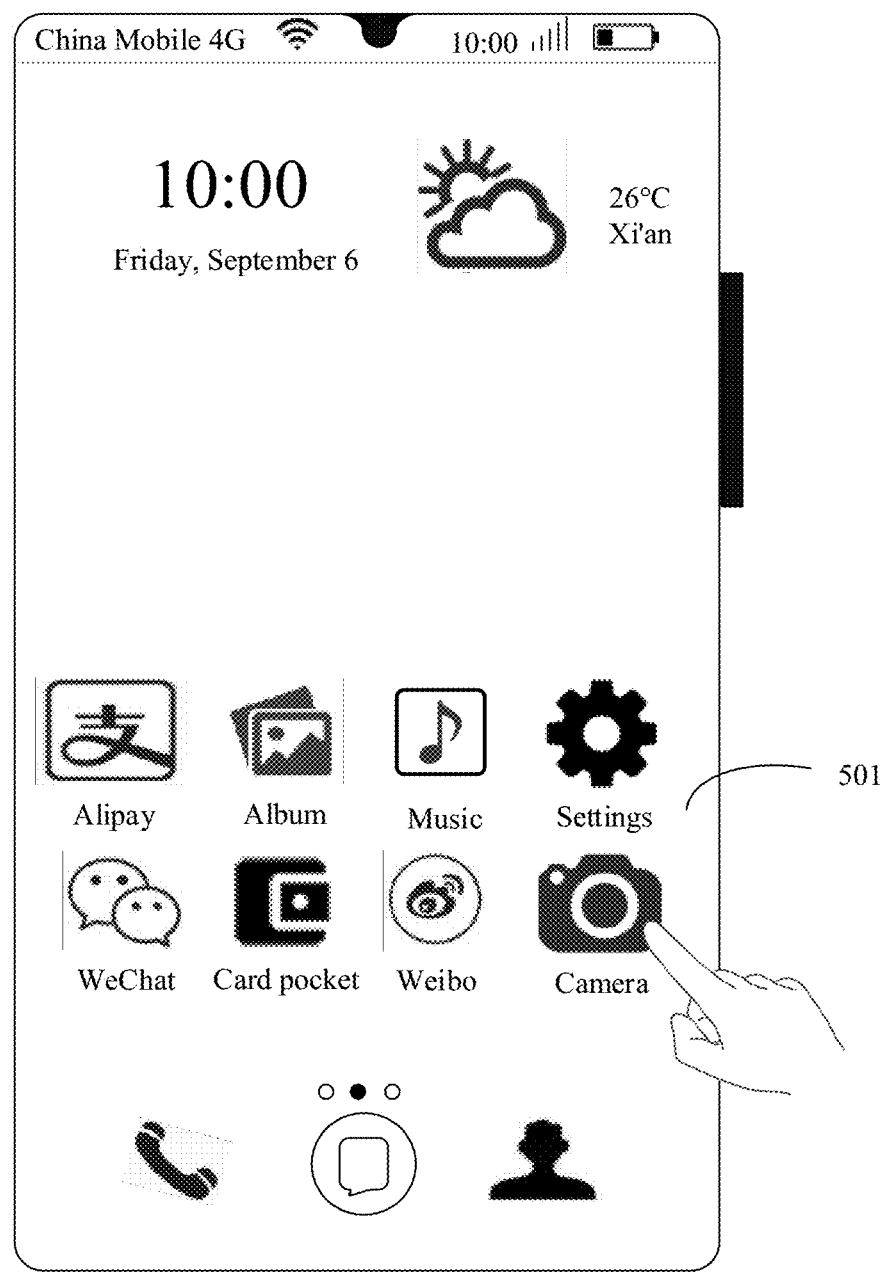
FIG. 5(a), FIG. 5(b), FIG. 5(c), and FIG. 5(d) are a schematic diagram of a graphical user interface of a second electronic device according to an embodiment of this application.

FIG. 5(a), FIG. 5(b), FIG. 5(c), and FIG. 5(d) are a schematic diagram of a graphical user interface of a second electronic device according to an embodiment of this application. It is shown in FIG. 5(a) that in an unlock mode of a mobile phone, a screen display system of the mobile phone displays currently output interface content 501, and a user may enter, by tapping a camera application, a photographing preview interface 502 shown in FIG. 5(b). A virtual shutter button 20 provided in this application is not displayed on the photographing preview interface 502 shown in FIG. 5(b), which is different from the case in which the virtual shutter button 20 is directly displayed on the photographing preview interface 402 shown in FIG. 4(b). The user may invoke the virtual shutter button 20 in different manners, so that the virtual shutter button 20 is displayed on the photographing preview interface.

Figure 5B:
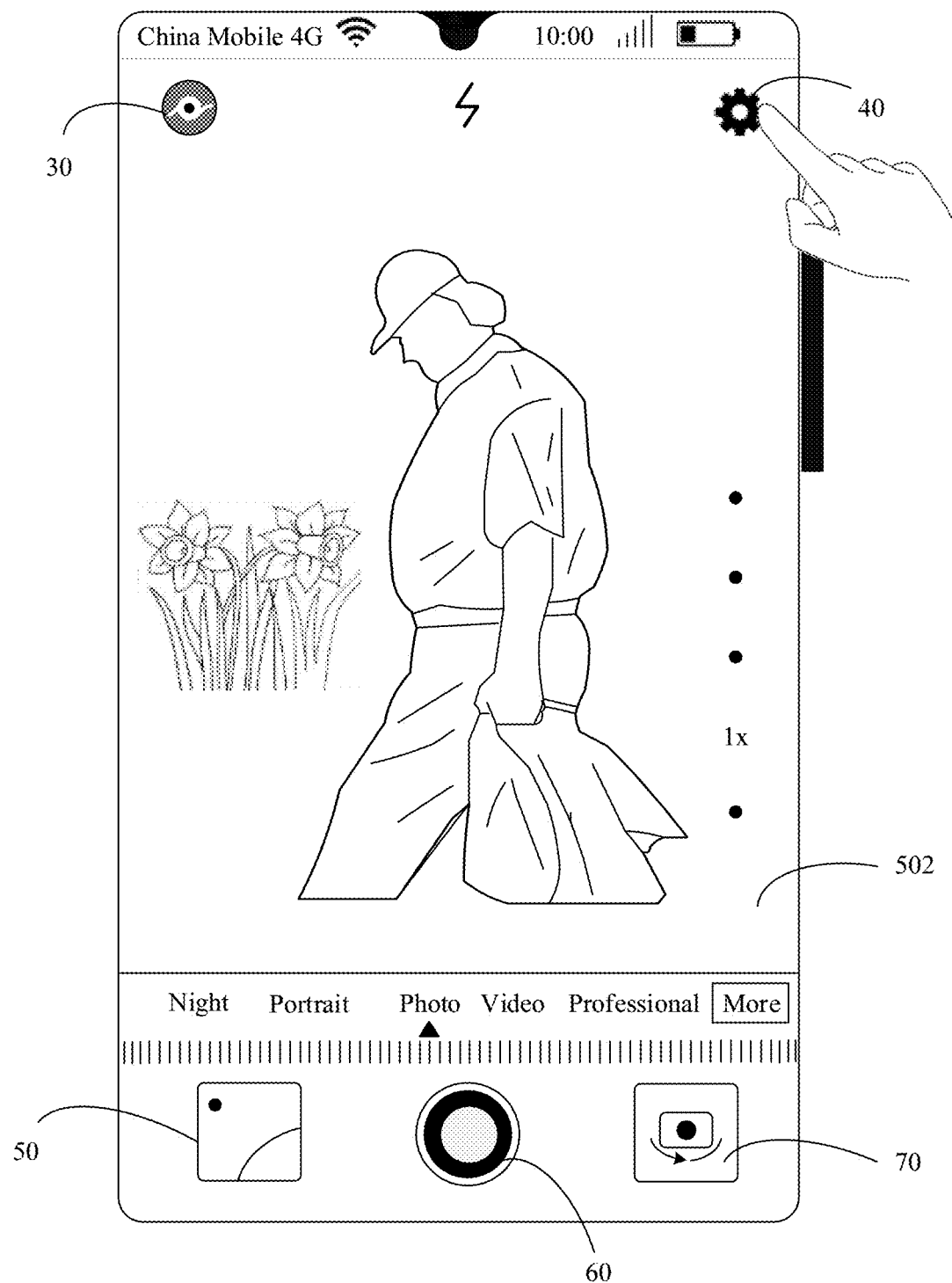
Figure 5C:
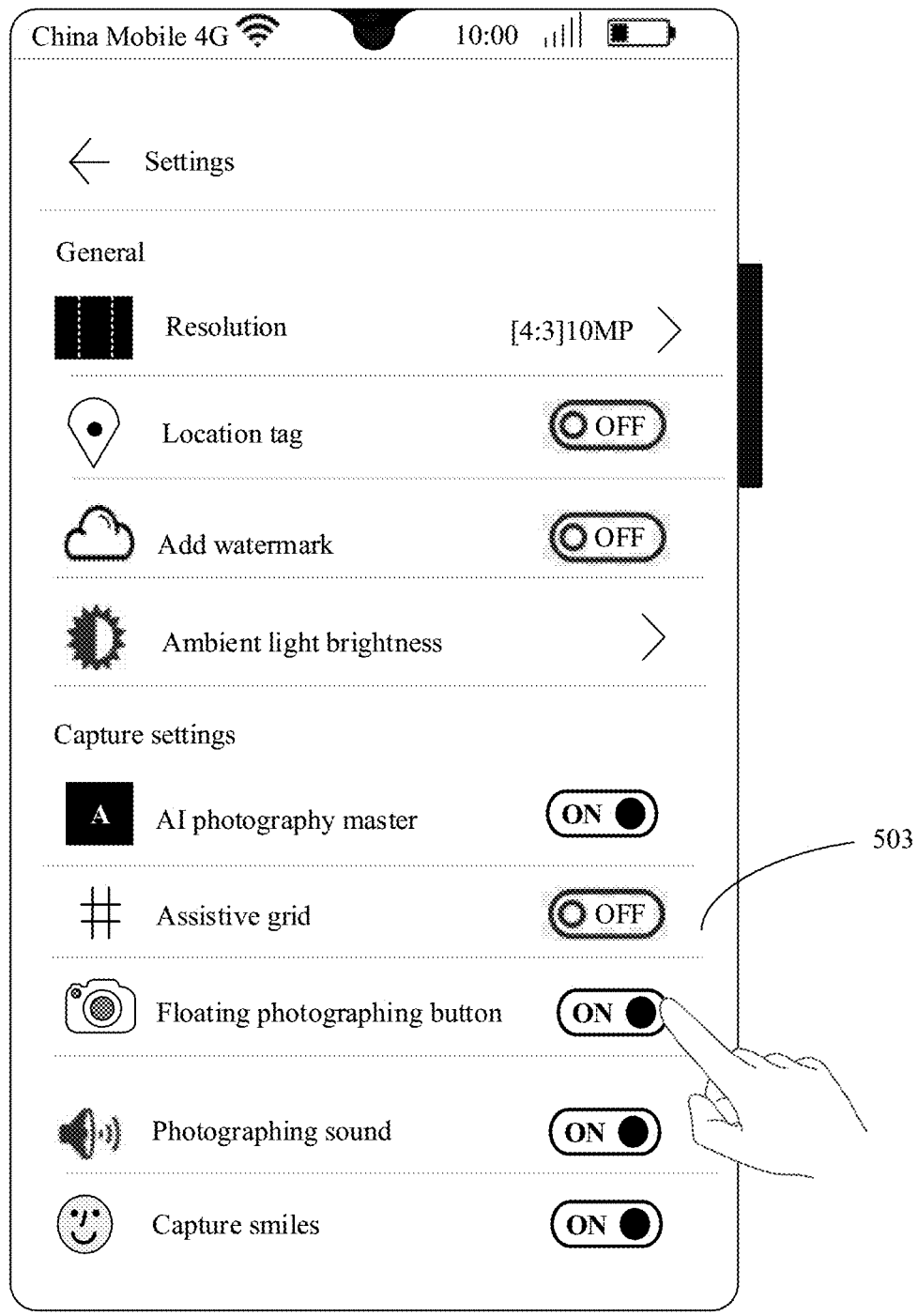
Figure 5D:
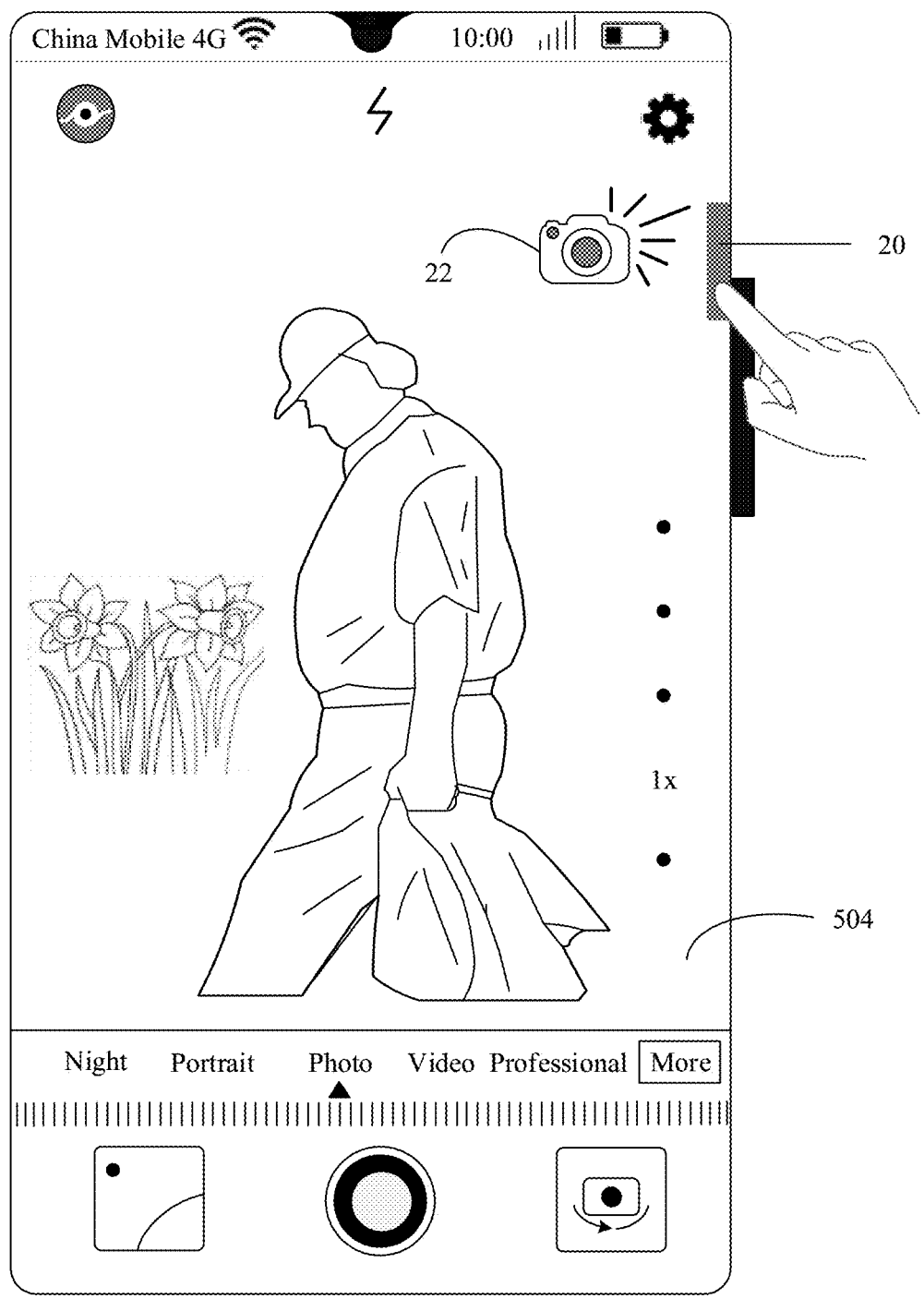

In an embodiment, as shown in FIG. 5(b), the user may invoke the newly added virtual shutter button 20 in this application by using a settings menu 40 on the photographing preview interface 502. Specifically, the user taps the settings menu 40, and in response to the tap operation performed by the user, the mobile phone displays a settings interface 503 shown in FIG. 5(c). The settings interface 503 includes general settings for options such as photographing resolution, location tag, and add watermark of the camera application and capture settings for options such as AI photography master, assistive grid, floating photographing button, photographing sound, and capture smiles in a photographing process. This is not limited in this application. In this application, an interface provided for the user for invoking the virtual shutter button 20 may be disposed in a photographing settings menu of a camera. The user performs an operation shown in FIG. 5(c), slides an on/off option of the floating photographing button to an "on" state. In this case, return to the photographing preview interface of the camera is implemented. As shown in FIG. 5(d), the virtual shutter button 20 may be displayed on a photographing preview interface 504, and photographing or video recording may be performed by tapping the virtual shutter button 20.

In an embodiment, the user may alternatively invoke, by performing a preset operation, the virtual shutter button 20 provided in this application.

Figure 6A:
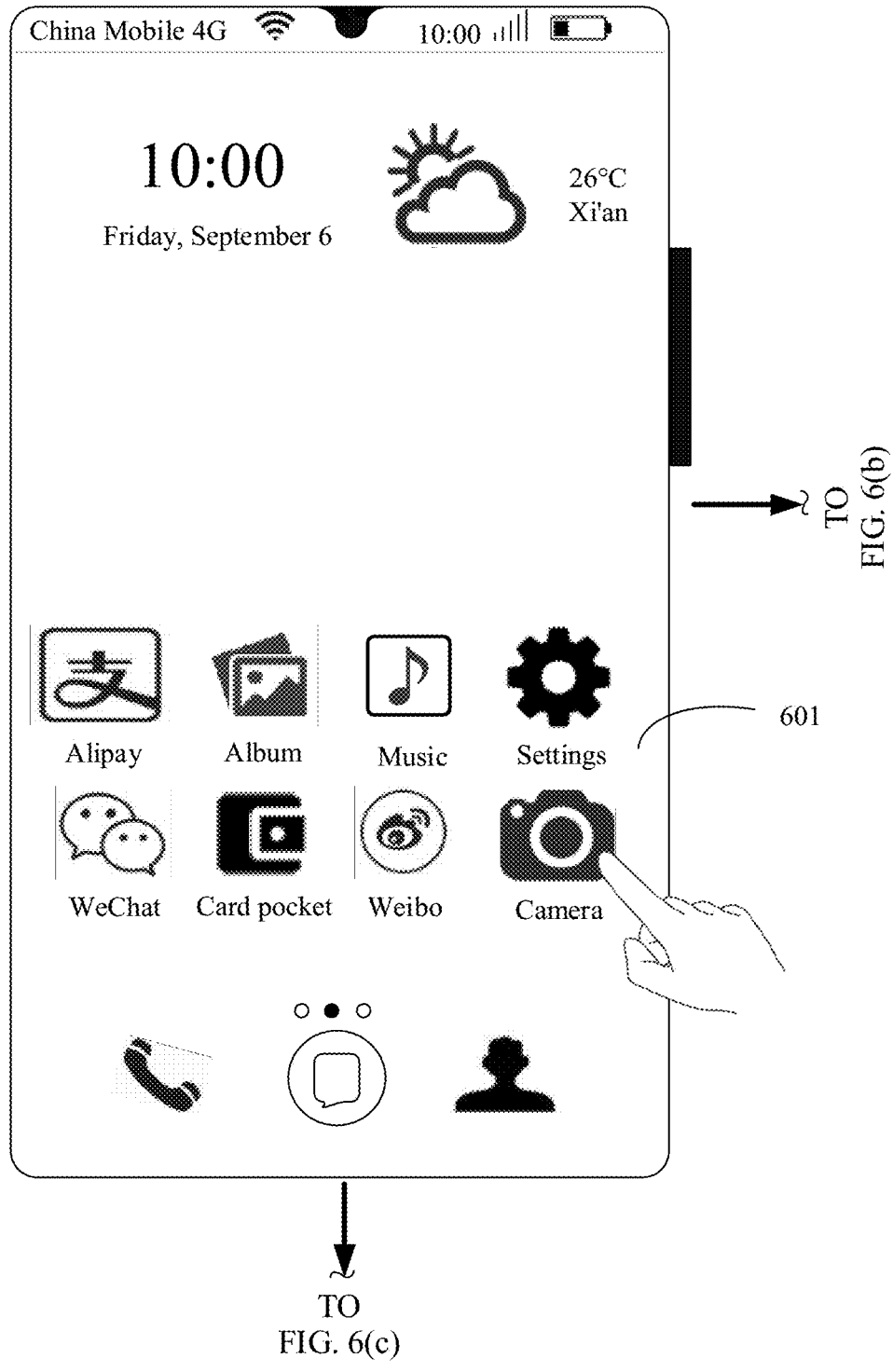
FIG. 6(a), FIG. 6(b), FIG. 6(c), and FIG. 6(d) are a schematic diagram of a graphical user interface of a third electronic device according to an embodiment of this application.
Figure 6B:
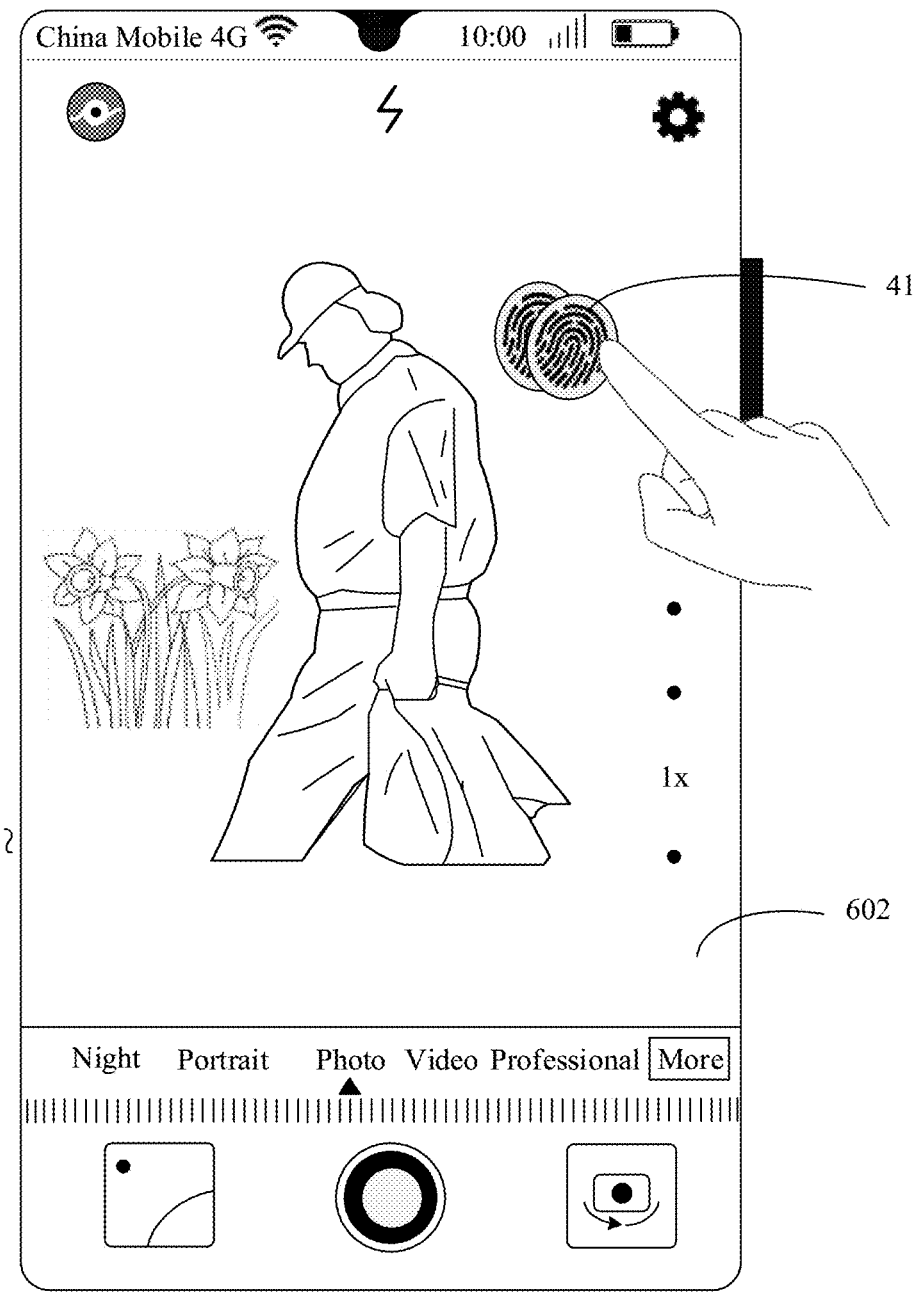
Figure 6C:
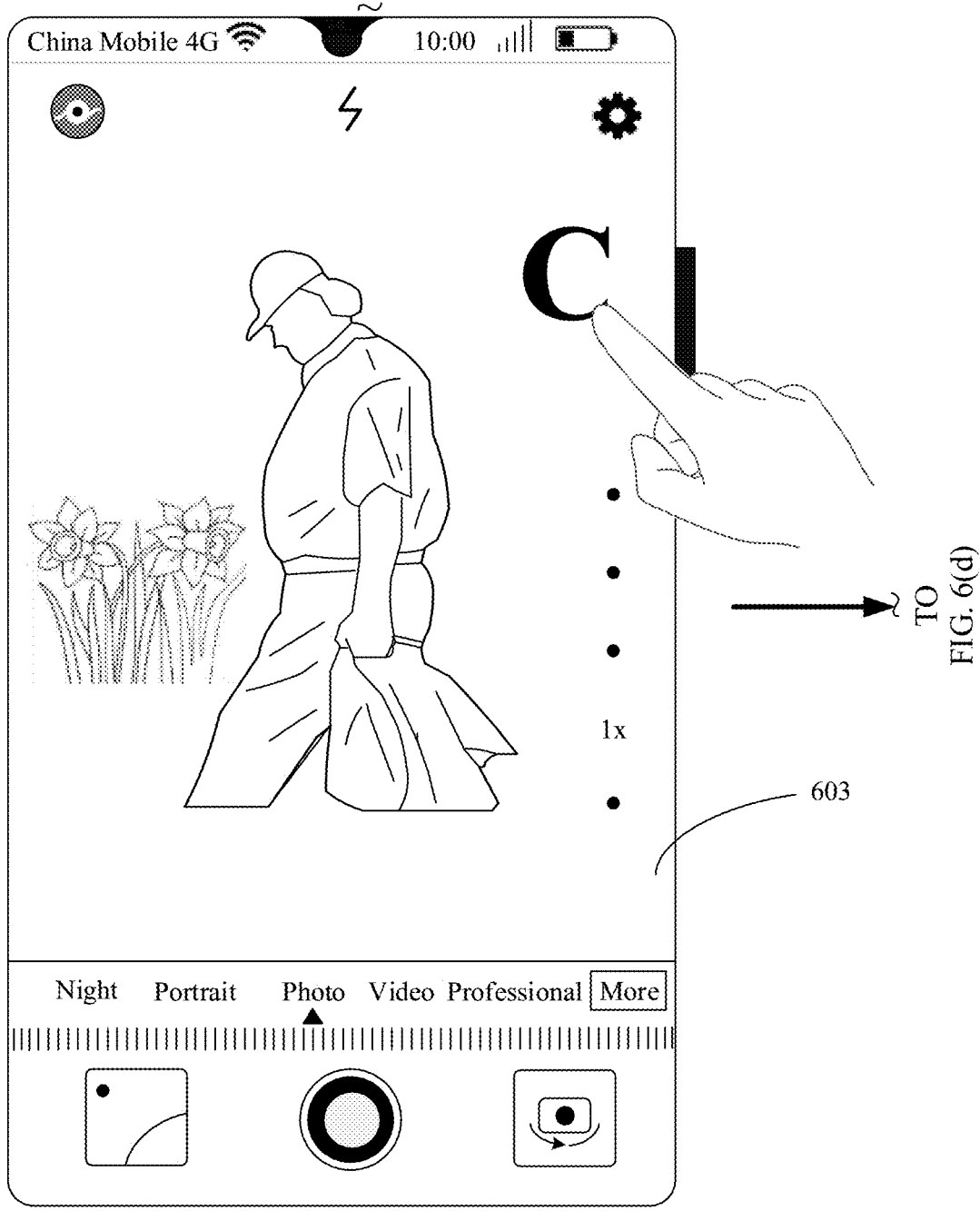
Figure 6D:
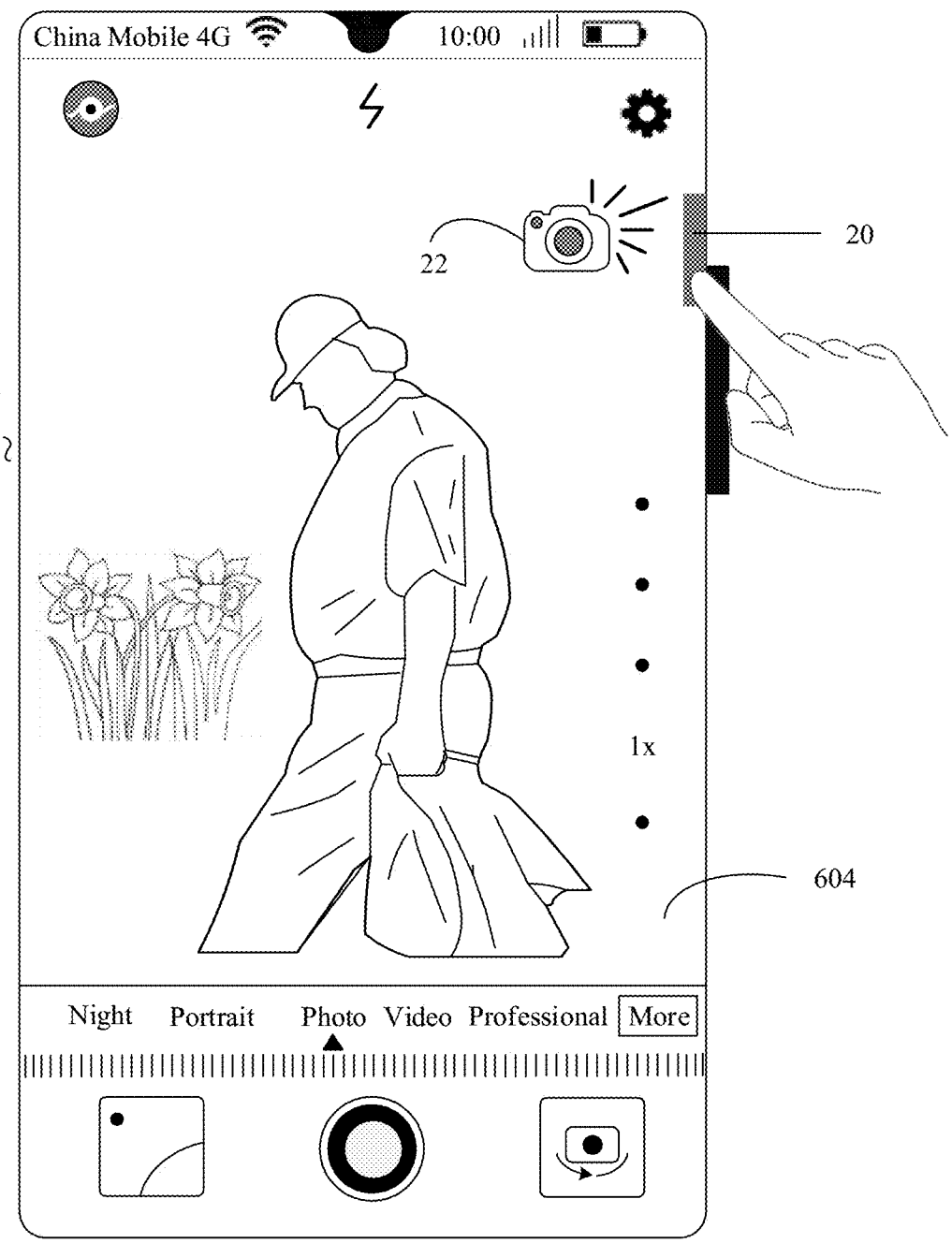

FIG. 6(a), FIG. 6(b), FIG. 6(c), and FIG. 6(d) are a schematic diagram of a graphical user interface of a third electronic device according to an embodiment of this application. FIG. 6(a) shows a home screen 601 of a mobile phone in an unlock mode, and a user enters, by tapping a camera application, a photographing preview interface 602 of the camera application shown in FIG. 6(b). The user may perform a double-tap operation shown in FIG. 6(b) on the photographing preview interface 602, and in response to the double-tap operation performed by the user, the mobile phone displays, on the photographing preview interface 602, a virtual shutter button 20 that is provided in this application and that is shown in FIG. 6(d).

Alternatively, the user may perform, on the photographing preview interface 602, an operation shown in FIG. 6(c). For example, the user performs an operation of drawing "C" on the photographing preview interface 602, and in response to the sliding operation performed by the user, the mobile phone displays, on the photographing preview interface 602, a virtual shutter button 20 that is provided in this application and that is shown in FIG. 6(*d*).

Alternatively, the user may invoke, by performing a preset operation on a shutter button 60, a virtual shutter button 20 provided in this application. For example, FIG. 7(*a*), FIG. 7(*b*), FIG. 7(*c*), FIG. 7(*d*), and FIG. 7(*e*) are a schematic diagram of a graphical user interface of a fourth electronic device according to an embodiment of this application. FIG. 7(*a*) shows a home screen 701 of a mobile phone in an unlock mode, and a user enters, by tapping a camera application, a photographing preview interface 702 of the camera application shown in FIG. 7(*b*). As shown in FIG. 7(*b*), a touch input operation that acts on a shutter button 60 on the photographing preview interface 702 is received. For example, the touch input operation may be a press and hold and move operation or a touch, select, and move operation. For example, after touching and selecting the shutter button 60, and holding the shutter button 60 for specific duration (for example, 2 seconds), the user moves the shutter button 60 from a display position of the shutter button 60 to another position, and in response to the touch, select, and move operation performed by the user, as shown in FIG. 7(*c*), the mobile phone generates a virtual shutter button in a same shape as the shutter button on the photographing preview interface. The virtual shutter button is referred to as a "virtual shutter button 20" in this application.

It should be understood that herein, moving the shutter button 60 to the another position may be understood as moving the shutter button 60 to any other position of the photographing preview interface. The touch, select, and move operation performed by the user may be used to trigger generation of a new virtual shutter button without affecting display of the original shutter button 60. For example, the original shutter button 60 is not moved. In other words, the display position of the shutter button 60 is not changed.

After the virtual shutter button is generated by performing the touch input operation by the user, the virtual shutter button may move along a trajectory of a touch and move operation performed by the user. In a moving process, the virtual shutter button may be presented in a translucent shape shown in FIG. 7(*d*).

In an embodiment, the virtual shutter button may be displayed on the photographing preview interface based on a touch and move input of the user, or may move to an edge position of a touchscreen after being displayed on the photographing preview interface for preset duration.

In an embodiment, a display form of the virtual shutter button at the edge position of the touchscreen may be the same as a display form of the virtual shutter button at another position of the photographing preview interface. For example, as shown in FIG. 7(*c*), the virtual shutter button and the shutter button 60 are in a same display form. Alternatively, a display form of the virtual shutter button at the edge position of the touchscreen is different from a display form of the virtual shutter button at another position of the photographing preview interface. For example, as shown in FIG. 7(*e*), the display form of the virtual shutter button at the edge position of the touchscreen may be changed to a long strip shape.

In an embodiment, an animation effect may be displayed in the moving process of the virtual shutter button, for example, a motion animation for a case in which the virtual shutter button moves from the photographing preview interface to an edge of the touchscreen, for example, a plurality of smooth animation effects such as a water droplet animation effect. This is not limited in this application In an embodiment, after the mobile phone generates, on the photographing preview interface, the virtual shutter button whose shape is the same as a display shape of the shutter button 60, the user may directly release the control by performing an upward operation, and the control may be automatically displayed in an edge region of the photographing preview interface. This is not limited in this application.

It should be understood that in addition to the operations such as the double-tap operation and the operation of drawing "C" that are described in FIG. 6(*a*), FIG. 6(*b*), FIG. 6(*c*), FIG. 6(*d*), FIG. 7(*a*), FIG. 7(*b*), FIG. 7(*c*), FIG. 7(*d*), and FIG. 7(*e*) and that are performed to invoke the virtual shutter button 20, the user may invoke the virtual shutter button 20 by performing another preset operation. For example, for the mobile phone with a curved screen shown in FIG. 3(*b*), the user may perform a frictional sliding operation or perform a tap operation with a finger joint on a side screen 302. A method and a preset operation for invoking the virtual shutter button 20 are not limited in this application.

It should be further understood that when the virtual shutter button 20 is displayed on the photographing preview interface by performing invoking through setting or by performing invoking by using the preset operation by the user, the user may be further reminded of a position and a shortcut function of the virtual shutter button 20 by using the manner of reminding the user by using a control described in FIG. 4(*a*), FIG. 4(*b*), FIG. 4(*c*), FIG. 4(*d*), and FIG. 4(*e*). For example, the reminder control 21 shown in FIG. 4(*c*) or the reminder control 22 shown in FIG. 4(*d*) is displayed on the photographing preview interface. This is not limited in this application.

In an embodiment, the mobile phone may determine, based on a current camera turn-on status, whether to display the virtual shutter button 20 on the photographing preview interface.

For example, when the user turns on a front-facing camera and in a state of taking a selfie, the mobile phone may display the virtual shutter button 20 on the photographing preview interface by default. When the user turns on a rear-facing camera and is not in a state of taking a selfie, the mobile phone may disable the virtual shutter button 20, and does not display the virtual shutter button 20 on the photographing preview interface. For example, it is shown in FIG. 4(*b*) that when the user is in the state of taking a selfie, the newly added virtual shutter button 20 may be automatically displayed on the photographing preview interface 402; and it is shown in FIG. 5(*b*) that when the user is not in the state of taking a selfie (the user photographs an object by using the rear-facing camera), the newly added virtual shutter button 20 may not be displayed on the photographing preview interface 502. When the user needs to invoke the virtual shutter button 20, the virtual shutter button 20 is displayed on the photographing preview interface by using the method described in FIG. 5(*a*), FIG. 5(*b*), FIG. 5(*c*), FIG. 5(*d*), FIG. 6(*a*), FIG. 6(*b*), FIG. 6(*c*), FIG. 6(*d*), FIG. 7(*a*), FIG. 7(*b*), FIG. 7(*c*), FIG. 7(*d*), or FIG. 7(*e*), to facilitate photographing by the user. It should be noted that in a process of using a photographing function of the mobile phone, when the user takes a selfie, better user experience is achieved if an operation is performed on the mobile phone with one hand. In this case, if the mobile phone automatically displays the virtual shutter button 20, convenience in performing an operation may be brought to the user, the user may gently touch the virtual shutter button 20 with any one of four fingers that hold the mobile phone, to obtain a photo. When the user photographs an object or a scene by using the rear-facing camera of the mobile phone, better user experience is achieved if an operation is performed with both hands. In this case, the mobile phone may not display the virtual shutter button 20, to provide a larger photographing preview interface for the user, thereby improving photographing experience of the user.

In an embodiment, whether to display the virtual shutter button 20 on the photographing preview interface may be determined based on a current interface display mode of the mobile phone.

In an embodiment, the interface display mode of the mobile phone may include a portrait display mode, a landscape display mode, or the like. For example, when the interface display mode of the mobile phone is switched from portrait display to landscape display, the virtual shutter button may be automatically displayed. For example, the virtual shutter button may be displayed in an upper right corner or an upper left corner of the photographing preview interface displayed in the landscape mode. Alternatively, the mobile phone determines, based on a holding posture of the user, that the user currently performs an operation with the right hand or the left hand. When it is determined that the user currently performs an operation with the right hand, the virtual shutter button is displayed in an upper right corner of the photographing preview interface in the landscape mode. When it is determined that the user currently performs an operation with the left hand, the virtual shutter button is displayed in an upper left corner of the photographing preview interface in the landscape mode. This is not limited in this application.

The foregoing describes different manners of invoking the virtual shutter button 20 by the user. Correspondingly, based on different use requirements, the user may disable the virtual shutter button 20 by using a same method, so that the virtual shutter button 20 is no longer displayed on the photographing preview interface.

For example, when the user displays the virtual shutter button 20 on the photographing preview interface by invoking the virtual shutter button 20 by using the method that is described in FIG. 4(*a*), FIG. 4(*b*), FIG. 4(*c*), FIG. 4(*d*), and FIG. 4(*e*) and in which the virtual shutter button 20 is invoked by using the settings menu, the user may correspondingly disable a "floating photographing button" function in the settings menu 40, and slide the "floating photographing button" to an "off" state.

Alternatively, when the user invokes, by performing the preset operation, the virtual shutter button 20 provided in this application, the user may correspondingly continue to disable the virtual shutter button 20 by performing the same preset operation.

Alternatively, if the mobile phone displays the virtual shutter button 20 on the photographing preview interface when the front-facing camera is currently turned on, when the user performs switching to the rear-facing camera, the mobile phone automatically disables the virtual shutter button 20.

Alternatively, the user may press and hold the virtual shutter button 20, and when the user presses and holds the virtual shutter button for preset duration, the virtual shutter button disappears. Alternatively, when the user presses the virtual shutter button 20 with specific force, the virtual shutter button disappears. Alternatively, when the user presses and holds the virtual shutter button or presses the virtual shutter button with force, a "delete" menu pops up, and the virtual shutter button is disabled by tapping the "delete" menu. It should be understood that a manner of disabling the virtual shutter button 20 is not limited in this application.

In an embodiment, the user may change a display position of the virtual shutter button based on different requirements.

Figure 8A:
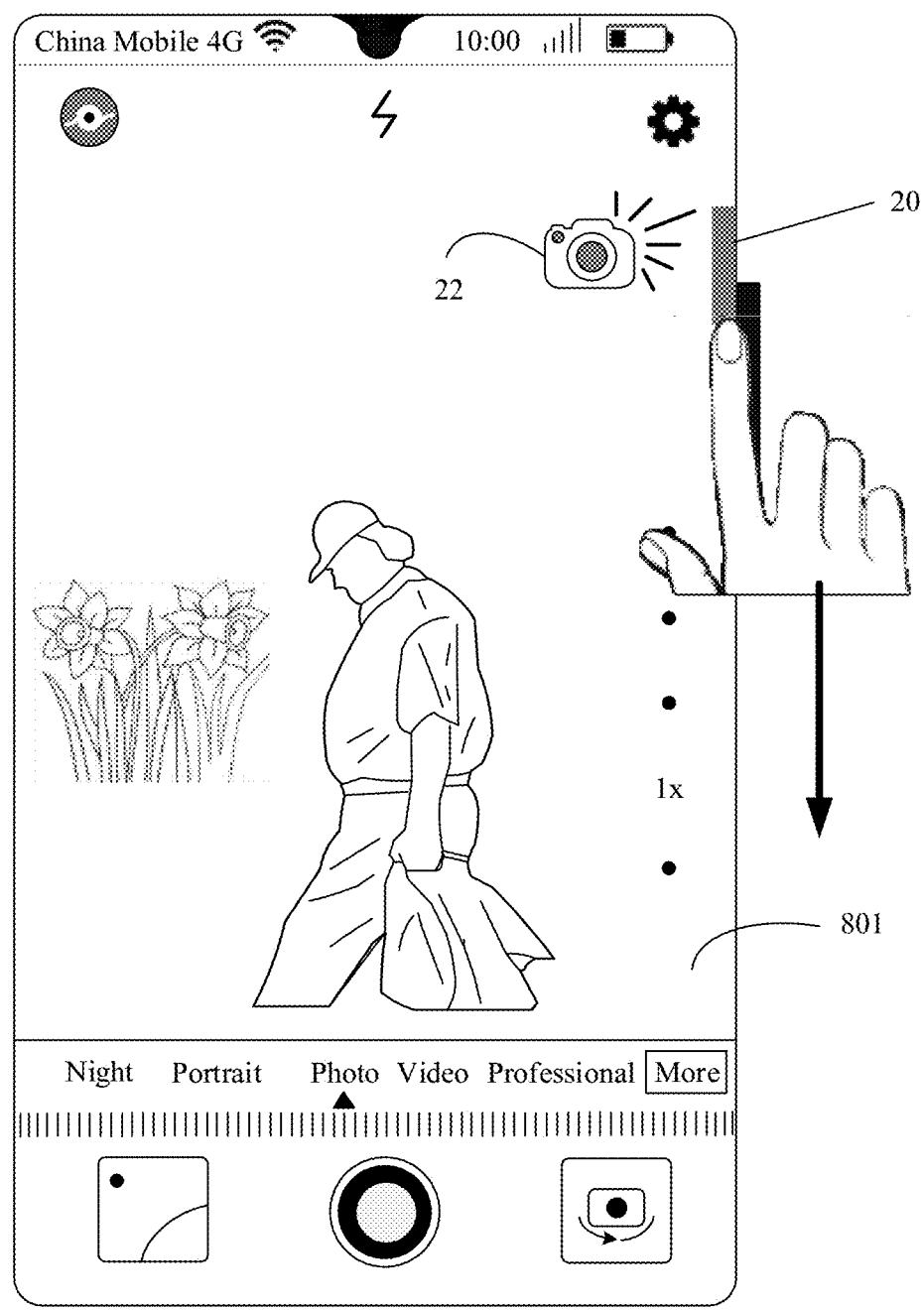
FIG. 8(a) and FIG. 8(b) are a schematic diagram of a graphical user interface of a fifth electronic device according to an embodiment of this application.
Figure 8B:
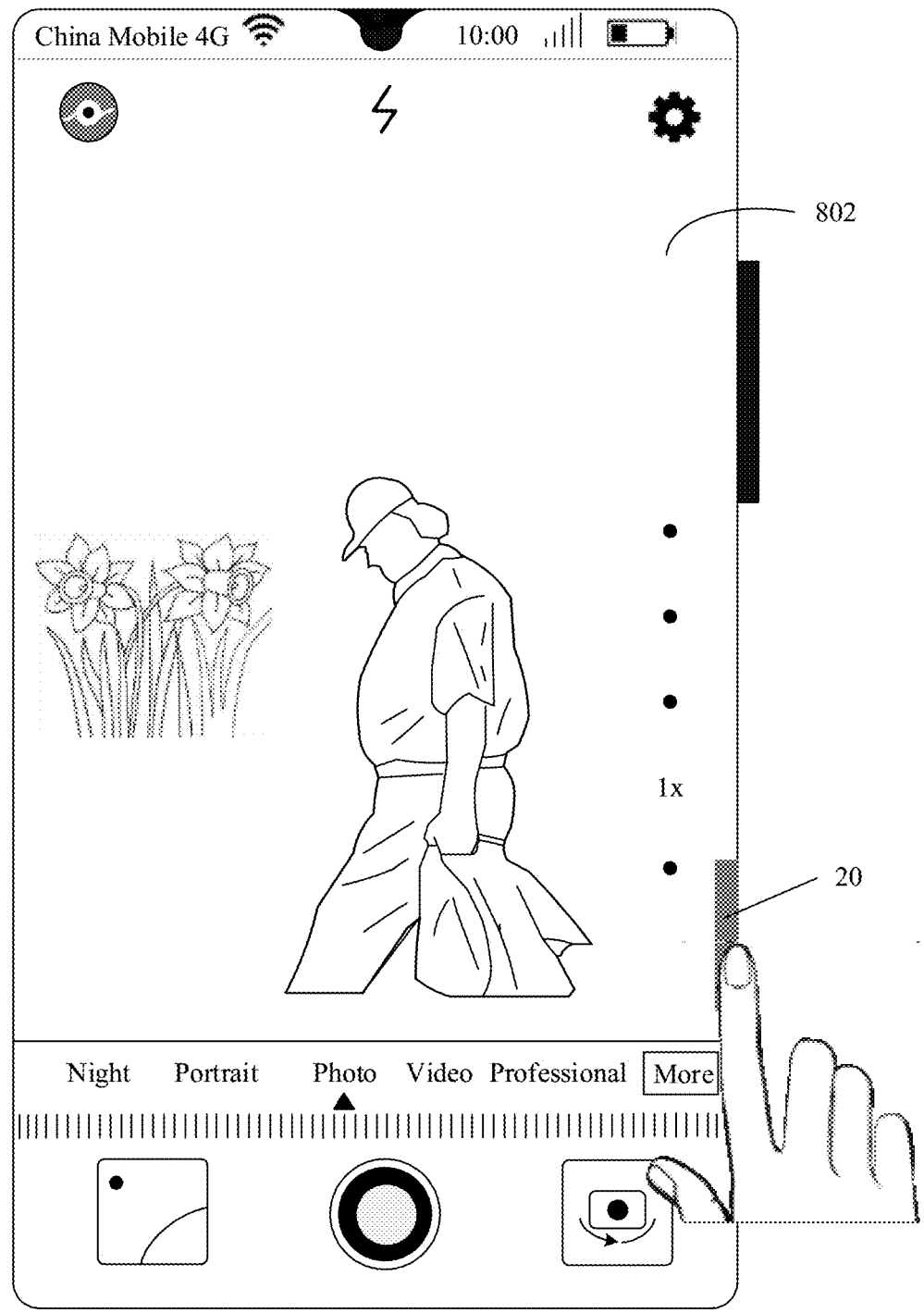

FIG. 8(*a*) and FIG. 8(*b*) are a schematic diagram of a graphical user interface of a fifth electronic device according to an embodiment of this application. FIG. 8(*a*) shows a photographing preview interface 801 of a camera application. A user may perform, on the photographing preview interface 801, a sliding operation shown in FIG. 8(*a*). Specifically, the user may touch a virtual shutter button 20, and performs a drag operation on the virtual shutter button 20. The virtual shutter button 20 on the photographing preview interface of a mobile phone may move along a trajectory of a touch and move operation performed by the user. As shown in FIG. 8(*a*), the user drags the virtual shutter button downwards in a vertical direction of a side edge of a screen of the mobile phone, and in response to the drag operation performed by the user, the virtual shutter button 20 on the photographing preview interface of the mobile phone also moves downwards in the vertical direction of the side edge of the mobile phone. When the user releases a hand, and a finger leaves a touchscreen, the virtual shutter button is displayed and stays at a position of an end point of the trajectory of the touch and move operation performed by the user. As shown in FIG. 8(*b*), the user may drag the virtual shutter button, and display the virtual shutter button at a position in a lower right corner of a photographing preview interface 802. A display position of the virtual shutter button 20 is not limited in this application.

In the foregoing solution, a manner of moving the virtual shutter button is provided for the user. When photographing different objects at different angles, the user may move the display position of the virtual shutter button on the photographing preview interface based on different use habits. In this way, different photographing requirements of the user are met, thereby improving photographing experience of the user.

It should be understood that the virtual shutter button 20 provided in this application may be displayed in different shapes, for example, a rectangular control or a circular control similar to a shutter button 60, and may be in different colors, for example, in a transparent floating state. In a process of dragging the virtual shutter button 20 by the user, the virtual shutter button may be displayed in different forms. For example, in the dragging process in FIG. 8(*a*) and FIG. 8(*b*), a display form of the virtual shutter button 20 may be the same as a display form that exists when the virtual shutter button 20 is static in an edge region of the photographing preview interface of the electronic device, and the virtual shutter button 20 is displayed in a long strip shape in either of cases.

In an embodiment, in the process of dragging by the user, the display form of the virtual shutter button 20 may be different from the display form that exists when the virtual shutter button 20 is static in the edge region of the photographing preview interface of the electronic device. FIG. 9(*a*), FIG. 9(*b*), FIG. 9(*c*), FIG. 9(*d*), and FIG. 9(*e*) are a schematic diagram of a graphical user interface of a sixth electronic device according to an embodiment of this application. FIG. 9(*a*) shows a photographing preview interface 901 of a camera application. A user may perform, on the photographing preview interface 901, a leftward drag operation shown in FIG. 9(*a*). In a dragging process, a virtual shutter button 20 may be displayed in an irregular shape, for example, an elliptical shape, a gourd shape, or a water droplet shape, shown in FIG. 9(b). This is not limited in this application.

In the process of dragging by the user, if the virtual shutter button 20 is dragged to a middle position of the photographing preview interface, and a finger of the user leaves a touchscreen, the virtual shutter button 20 may stay at the current position. For example, in operations shown in FIG. 9(b) and FIG. 9(c), when the user drags the virtual shutter button, an irregular bubble 80 is displayed, and the irregular bubble 80 is in a transparent floating state in the dragging process. After the finger of the user leaves the touchscreen, the irregular bubble 80 may be restored and displayed as a virtual shutter button 90 in normal greyscale.

Figure 9A:
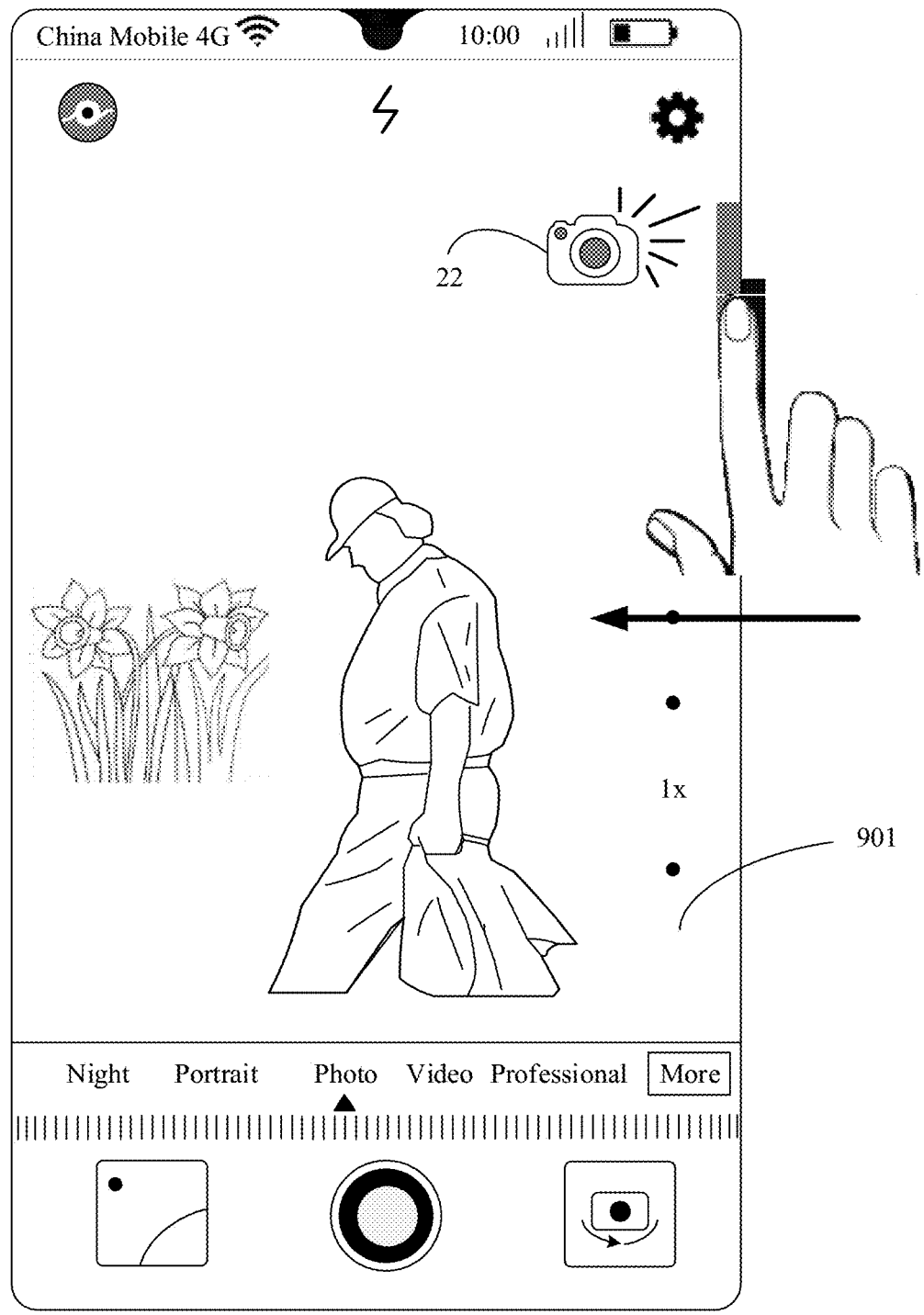
FIG. 9(a), FIG. 9(b), FIG. 9(c), FIG. 9(d), and FIG. 9(e) are a schematic diagram of a graphical user interface of a sixth electronic device according to an embodiment of this application.
Figure 9B:
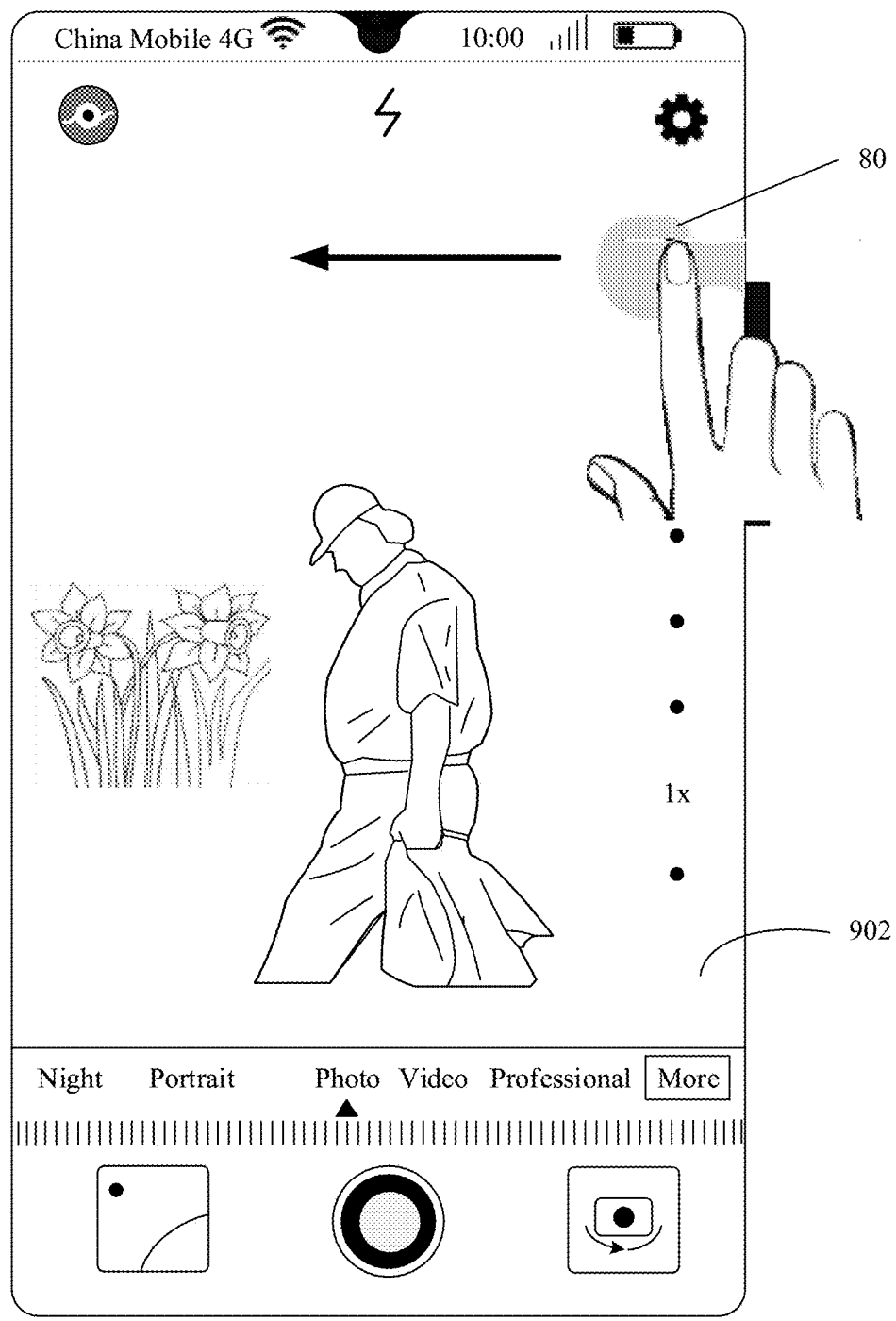
Figure 9C:
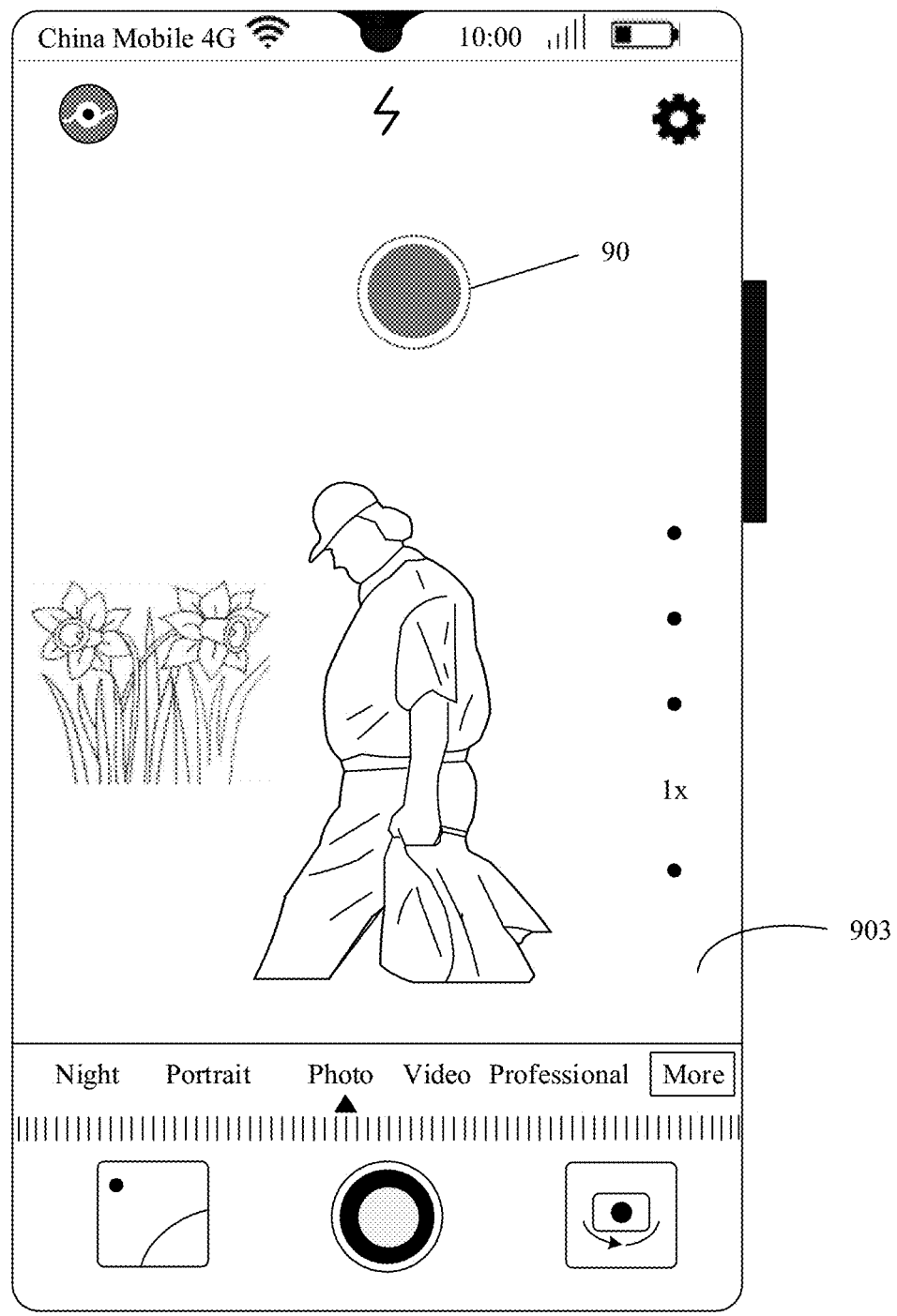
Figure 9D:
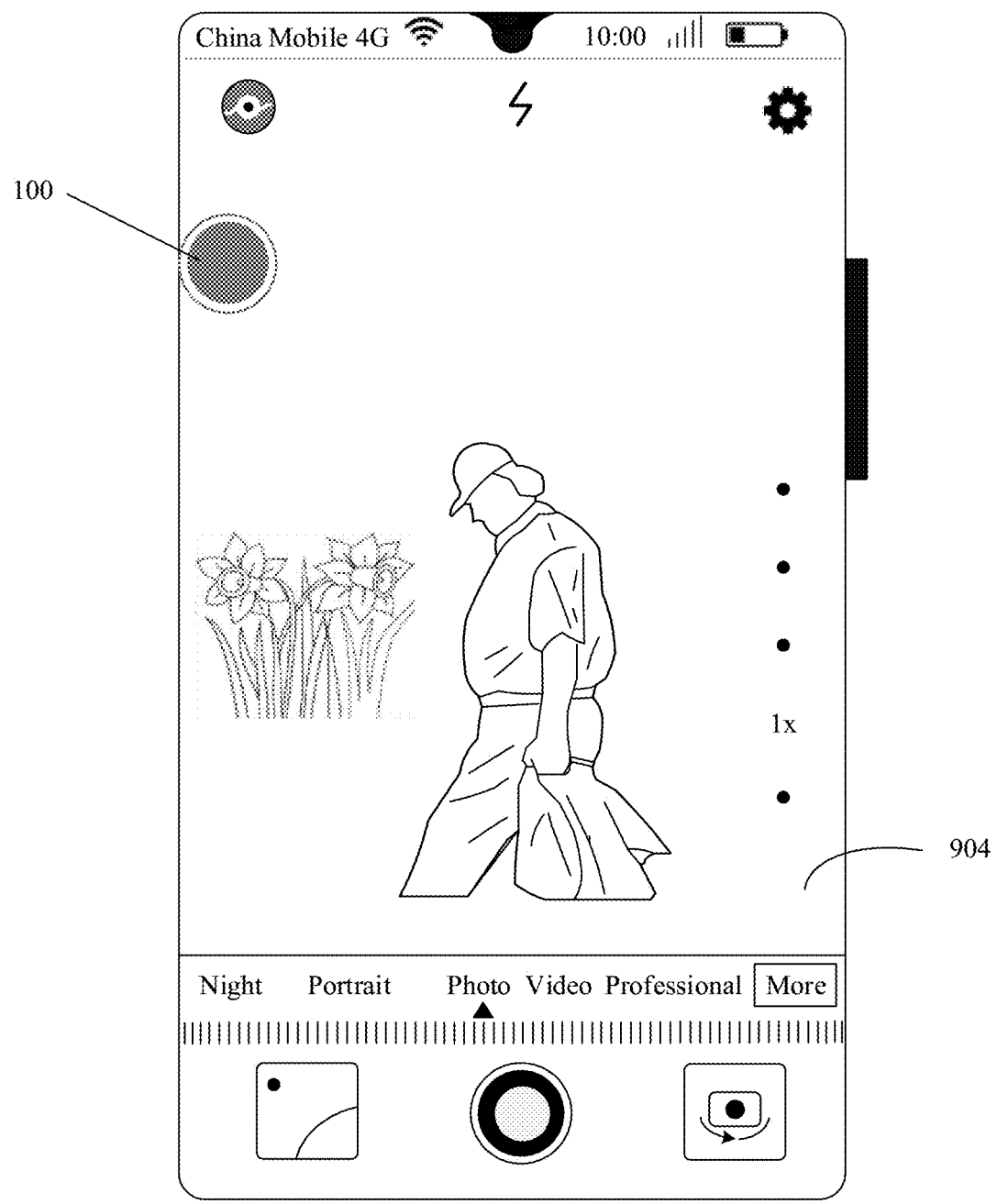
Figure 9E:
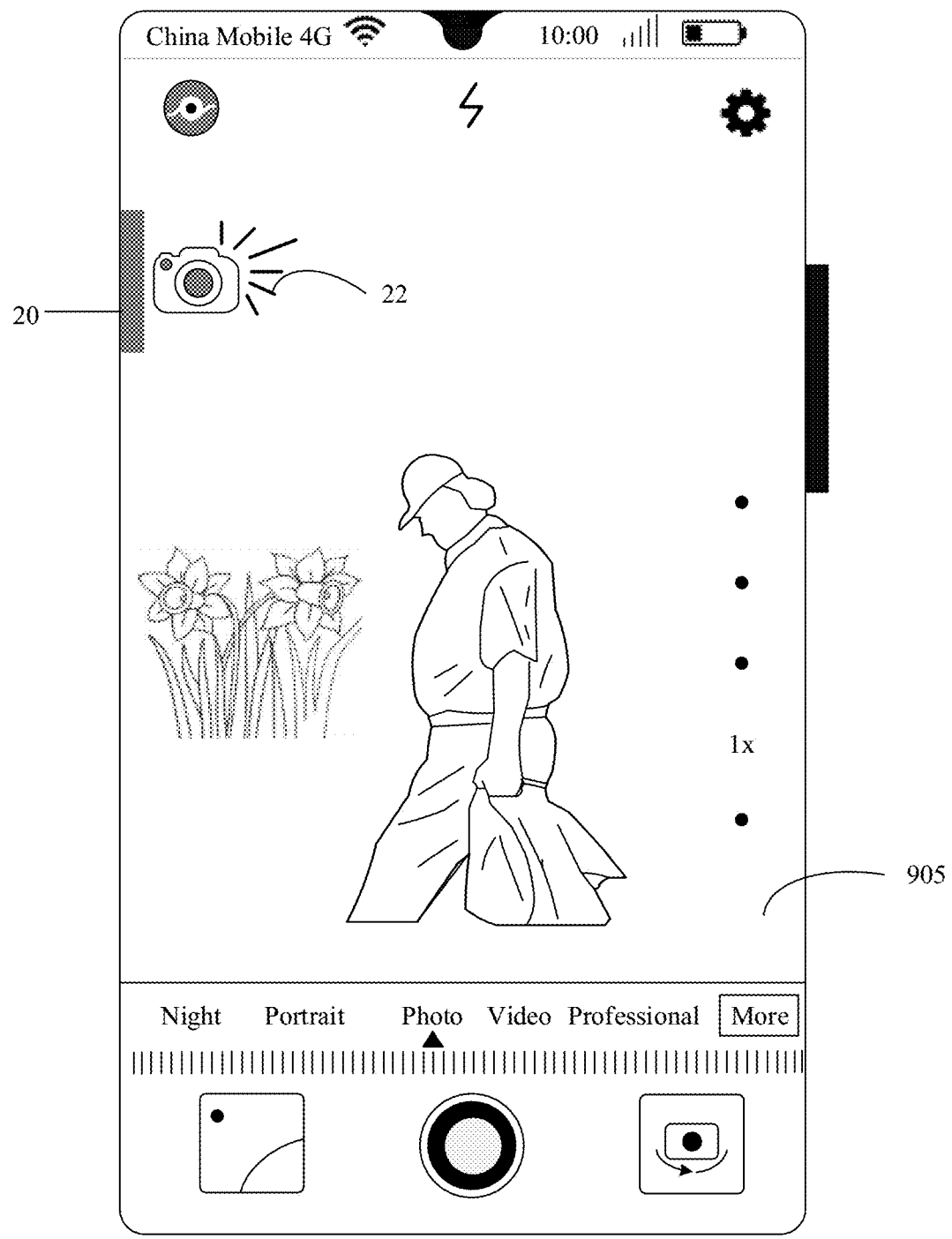

In an embodiment, after the finger of the user leaves the touchscreen, the virtual shutter button 90 may be displayed for specific duration, and then automatically move to an edge of the photographing preview interface. For example, in operations shown in FIG. 9(b), FIG. 9(c), and FIG. 9(d), when the user drags the virtual shutter button, the irregular bubble 80 is displayed. After the finger of the user leaves the touchscreen, the virtual shutter button may be displayed as the virtual shutter button 90 in normal greyscale at the middle position of the photographing preview interface. After being displayed for specific duration (for example, 3 seconds), the virtual shutter button 90 may automatically approach an edge of a photographing preview interface 904. For example, if being relatively close to a left edge, the virtual shutter button 90 may automatically move to the left edge of a screen, or return to a display position that exists before the user drags the virtual shutter button, and may be displayed as a circular control 100 in normal greyscale. Alternatively, as shown in FIG. 9(e), the virtual shutter button is displayed as a rectangular virtual shutter button 20 that occupies a relatively small area. This is not limited in this application.

The drag operation is performed, so that in the process of dragging by the user, the virtual shutter button may be more clearly and smoothly displayed on the photographing preview interface in a dynamic display effect, thereby improving visual experience and operation experience of the user.

It should be understood that after the user performs the drag operation on the virtual shutter button, as shown in FIG. 9(e), the virtual shutter button may continue to be reduced to be displayed in a form of the rectangular virtual shutter button 20 that exists before the drag operation is performed, to reduce an occupied area on a photographing preview interface 905, and provide a larger photographing preview interface for the user, thereby improving photographing experience of the user.

It should be further understood that after a moving process and a final display position of the virtual shutter button 20 on the photographing preview interface are determined based on the drag operation performed by the user, the user may be further reminded of the position and a shortcut function of the virtual shutter button 20 by using the reminder control 21 or the reminder control 22 described in FIG. 4(a), FIG. 4(b), FIG. 4(c), FIG. 4(d), and FIG. 4(e). This is not limited in this application.

According to the virtual shutter button provided in this application, a virtual floating shutter button may be provided for the user on the photographing preview interface of the camera application, and the virtual floating shutter button has the same function as the shutter button of the camera application. The user may implement a photographing or video recording function by tapping the virtual shutter button. When the user uses the photographing function of the electronic device, the virtual shutter button may move on the photographing preview interface based on a touch input of the user, thereby improving photographing experience of the user. In addition, a photographing operation may be completed if the user touches and taps the virtual shutter button, and therefore, shake caused by taking a photo by pressing a mechanical button (for example, a volume button) is avoided, and quality of a captured photo is ensured. In this way, different photographing requirements of the user can be met, thereby improving photographing experience of the user.

It should be understood that the method may be applied to various types of electronic devices. In an embodiment, the method may be applied to an electronic device whose display screen is of a relatively large screen size, for example, the foldable electronic device shown in (a) or an electronic device with a curved screen shown in FIG. 3(b). When a display screen of the foldable electronic device is expanded, the user faces the display screen with a relatively large screen size, and may complete a photographing operation based on the method provided in this application, by using the virtual shutter button, and by dragging the virtual shutter button to a position convenient for an operation.

Figure 10A:
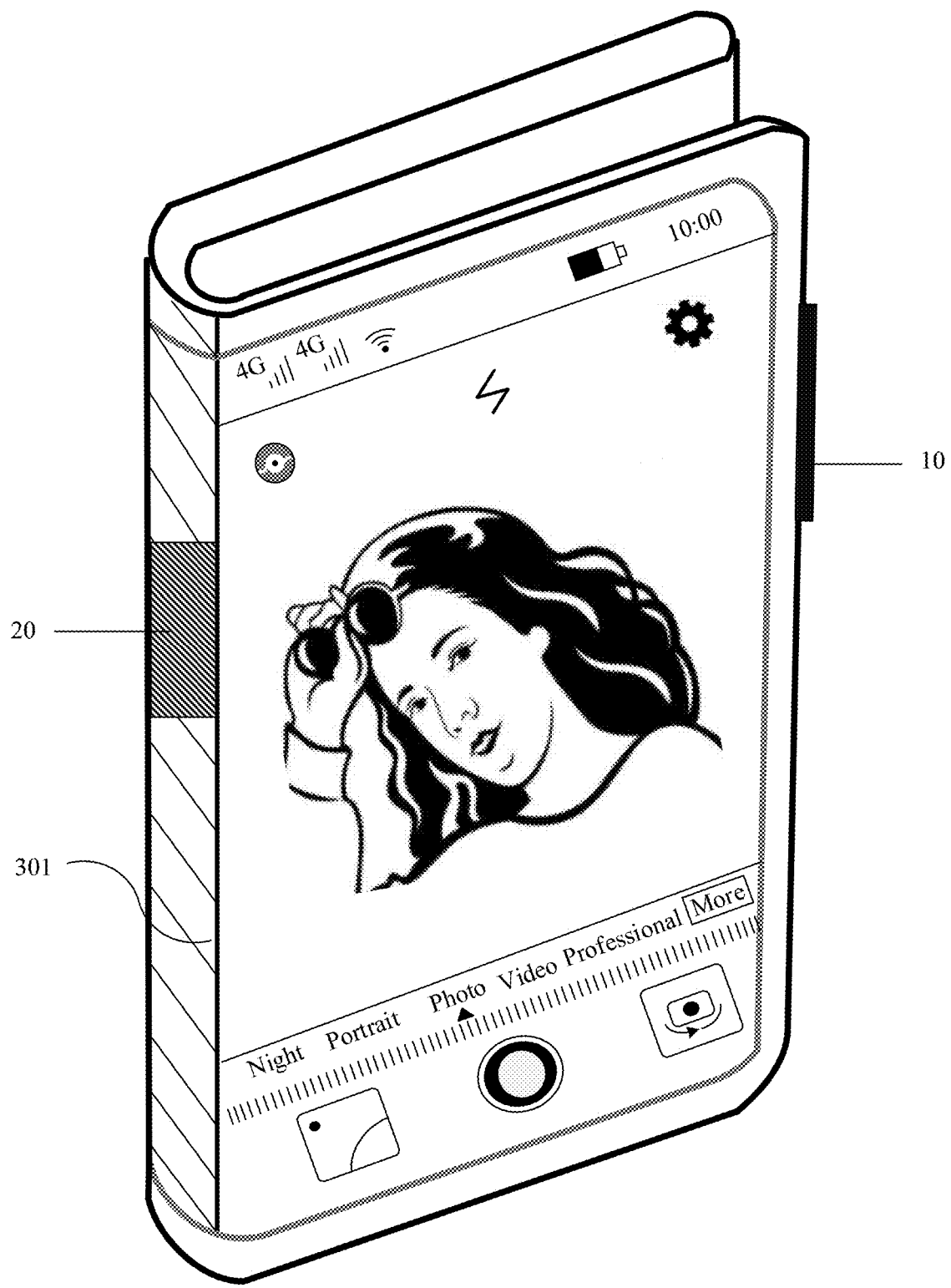
FIG. 10(a) and FIG. 10(b) are a schematic diagram of displaying a virtual shutter button on an electronic device according to this application.
Figure 10B:
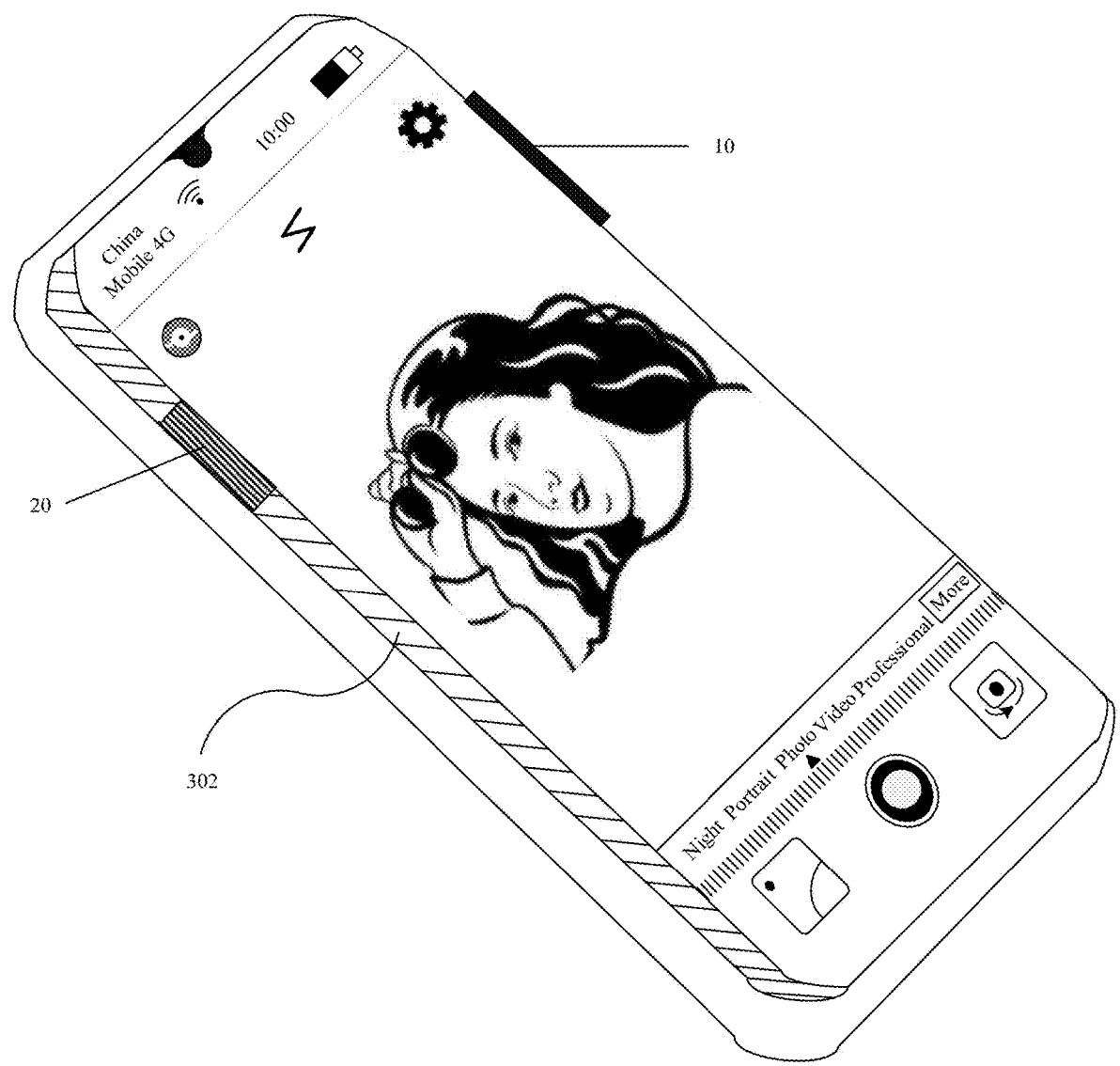

FIG. 10(a) and FIG. 10(b) are a schematic diagram of displaying a virtual shutter button on an electronic device according to this application. As shown in FIG. 10(a), when the electronic device is a foldable electronic device, and is in a folded state, when a user takes a selfie, the virtual shutter button 20 may be displayed on a side screen 301 of the foldable electronic device, and the virtual shutter button may be displayed without occupying a photographing preview interface. In an embodiment, the virtual shutter button 20 may be displayed, based on dragging by the user, in a display region, namely, the photographing preview interface, currently used by the user or an edge region of the photographing preview interface, to improve photographing experience of the user. In this way, different photographing requirements of the user can be met, thereby improving photographing experience of the user.

Alternatively, the method may be applied to an electronic device with a curved screen. As shown in FIG. 10(b), for the electronic device with a curved screen, the virtual shutter button provided in this application may be located in a curved side region 302 of the curved screen of the electronic device shown in FIG. 10(b). In this case, for the user, the virtual shutter button is displayed by occupying only the curved side region of the electronic device with a curved screen, and therefore a better image preview effect can be provided for the user. In an embodiment, based on a use habit of the user, the virtual shutter button 20 may be displayed at different positions when being dragged by the user, to improve photographing experience of the user. In this way, different photographing requirements of the user can be met, thereby improving photographing experience of the user.

Alternatively, the method is applied to an electronic device that includes no mechanical button (volume button). A method, for obtaining a photo, other than a method for obtaining a photo by using a shutter button is provided for the user, so that based on a use habit of the user, the virtual shutter button may be displayed at different positions when being dragged by the user, to improve photographing experience of the user. In this way, different photographing requirements of the user can be met, thereby improving photographing experience of the user.

It should be understood that in addition to the camera application of the mobile phone, the virtual shutter button provided in this application may be applied to various third-party applications with a photographing or video recording function, for example, BeautyCam and Pitu. This is not limited in this application. Alternatively, the virtual floating control provided in this application may be further applied to another non-photographing application. This is not limited in this application.

With reference to the foregoing embodiments and related accompanying drawings, an embodiment of this application provides a photographing method. The method may be implemented, for example, in the electronic device (for example, a mobile phone or a tablet computer) that includes a touchscreen and a camera and that is shown in FIG. 1 or FIG. 2. FIG. 11 is a schematic flowchart of a photographing method according to an embodiment of this application. As shown in FIG. 11, the method may include the following operations.

1101. Display a first photographing preview interface, where the first photographing preview interface includes a first button and a second button, both the first button and the second button are used to perform a photographing operation, the first button is displayed at a first preset position of the first photographing preview interface in a first shape, the second button is displayed at a second position in a second shape, the second position is located in an edge region of the first photographing preview interface, and the second shape is different from the first shape.

1102. Perform the photographing operation in response to a first input that acts on the second button.

It should be understood that in this application, an "image preview display interface of a camera application" is referred to as a "photographing preview interface". The photographing preview interface may include a region used to present a preview image during photographing, and may further include a plurality of function controls such as a settings menu, a smart visual control, an album shortcut control, a shutter button, a camera switching control, various photographing mode selection controls, and a photographing parameter settings menu. This is not limited in this application.

It should be further understood that the first button may be understood as an original shutter button used for photographing by a mobile phone, and the second button is a virtual shutter button additionally provided on the photographing preview interface. The virtual shutter button may be a virtual shutter button displayed on the photographing preview interface, and the virtual shutter button may have a same function as the original shutter button. In other words, the virtual shutter button may be independent of the shutter button, and a user may implement a photographing or video recording function by touching the virtual shutter button.

In an embodiment, a third shape is the same as the first shape of the first button. For example, each of the third shape and the first shape is a circular shape of the original shutter button 60 in FIG. 4(*b*).

In an embodiment, the second shape is a long strip shape. For example, as shown in FIG. 4(*b*), the virtual shutter button 20 is displayed in the long strip shape in an edge region in an upper right corner of the photographing preview interface of the mobile phone.

It should be understood that a display shape of the virtual shutter button may be the same as a shape of the shutter button. For example, both the virtual shutter button and the shutter button are in a circular shape presented by the shutter button. Alternatively, a display shape may be different from a shape of the shutter button. For example, the virtual shutter button may be in a long strip shape (rectangular shape). Alternatively, the virtual shutter button may be displayed in different shapes such as a triangle, an arc shape, or a dotted line. This is not limited in this application.

In an embodiment, the virtual shutter button may be displayed as a transparent floating button, a greyscale floating button, or a dynamically displayed button, for example, in a flashing state. A color, transparency, and a display effect of the virtual shutter button are not limited in this application.

In an embodiment, the virtual shutter button may be displayed at any position of the photographing preview interface. For example, the virtual shutter button may be attached to a side edge of a touchscreen or a top or bottom end of a touchscreen. A display position of the virtual shutter button is not limited in this application.

In an embodiment, the virtual shutter button may be used to receive an input operation performed by the user, and the display position of the virtual shutter button may be changed. Specifically, the electronic device displays a second photographing preview interface, where the second photographing preview interface includes the first button and the second button, the second button is displayed at a third position in the third shape, and the third position is located in a middle region of the second photographing preview interface; and moves the second button from the third position to the second position in response to a second input that acts on the second button.

It should be understood that the user may change the display position of the virtual shutter button based on different requirements. Specifically, the user may touch the virtual shutter button, and perform a drag operation on the virtual shutter button, and the virtual shutter button on the photographing preview interface of the mobile phone may move along a trajectory of a touch and move operation performed by the user.

For example, as shown in FIG. 8(*a*) and FIG. 8(*b*), the second input may be an operation of touching and dragging the virtual shutter button by the user. In response to the touch and drag operation performed by the user, the virtual shutter button is displayed and stays at a position of an end point of the trajectory of the touch and move operation performed by the user.

In the foregoing solution, a manner of moving the virtual shutter button is provided for the user. When photographing different objects at different angles, the user may move the display position of the virtual shutter button on the photographing preview interface based on different use habits. In this way, different photographing requirements of the user are met, thereby improving photographing experience of the user.

In an embodiment, when the second button is displayed at the second position, the second button is moved from the second position to a fourth position in response to a third input that acts on the second button. When the fourth position is located in the edge region of the first photographing preview interface, the second button is in the second shape; or when the fourth position is located in the middle region of the second photographing preview interface, the second button is in the third shape.

The virtual shutter button provided in this application may be displayed in different shapes, for example, a rectangular control or a circular control similar to the shutter button, and may be in different colors, for example, in a transparent floating state. In a process of dragging the virtual shutter button by the user, the virtual shutter button may be displayed in different forms. For example, in the process of dragging the virtual shutter button by the user, a display form of the virtual shutter button may be the same as a display form that exists when the virtual shutter button is static at a specific position in an edge region of the photographing preview interface of the electronic device, and the virtual shutter button is displayed in the long strip shape in either of cases.

In an embodiment, the user may display the virtual shutter button on the photographing preview interface by performing an input operation such as setting, invoking, or a preset gesture. For example, as shown in FIG. 5(a), FIG. 5(b), FIG. 5(c), FIG. 5(d), FIG. 6(a), FIG. 6(b), FIG. 6(c), FIG. 6(d), FIG. 7(a), FIG. 7(b), FIG. 7(c), FIG. 7(d), and FIG. 7(e), the user may display the virtual shutter button on the photographing preview interface by using different methods.

For example, when the user displays the virtual shutter button on the photographing preview interface by invoking the virtual shutter button by using a settings menu, the user may correspondingly disable a "floating photographing button" function in the settings menu, and slide the "floating photographing button" to an "off" state.

Alternatively, when the user invokes, by performing a preset operation, the virtual shutter button provided in this application, the user may correspondingly continue to disable the virtual shutter button by performing the same preset operation.

Alternatively, if the mobile phone displays the virtual shutter button on the photographing preview interface when a front-facing camera is currently turned on, when the user performs switching to a rear-facing camera, the mobile phone automatically disables the virtual shutter button.

Alternatively, the user may press and hold the virtual shutter button, and when the user presses and holds the virtual shutter button for preset duration, the virtual shutter button disappears. Alternatively, when the user presses the virtual shutter button with specific force, the virtual shutter button disappears. Alternatively, when the user presses and holds the virtual shutter button or presses the virtual shutter button with force, a "delete" menu pops up, and the virtual shutter button is disabled by tapping the "delete" menu. It should be understood that a manner of disabling the virtual shutter button is not limited in this application.

In an embodiment, before the displaying a first photographing preview interface, the method further includes: displaying a third photographing preview interface, where the third photographing preview interface includes the first button and does not include the second button; and displaying the second button on the third photographing preview interface in response to a fifth input.

In an embodiment, the fifth input acts on the first/second button.

Figure 7A:
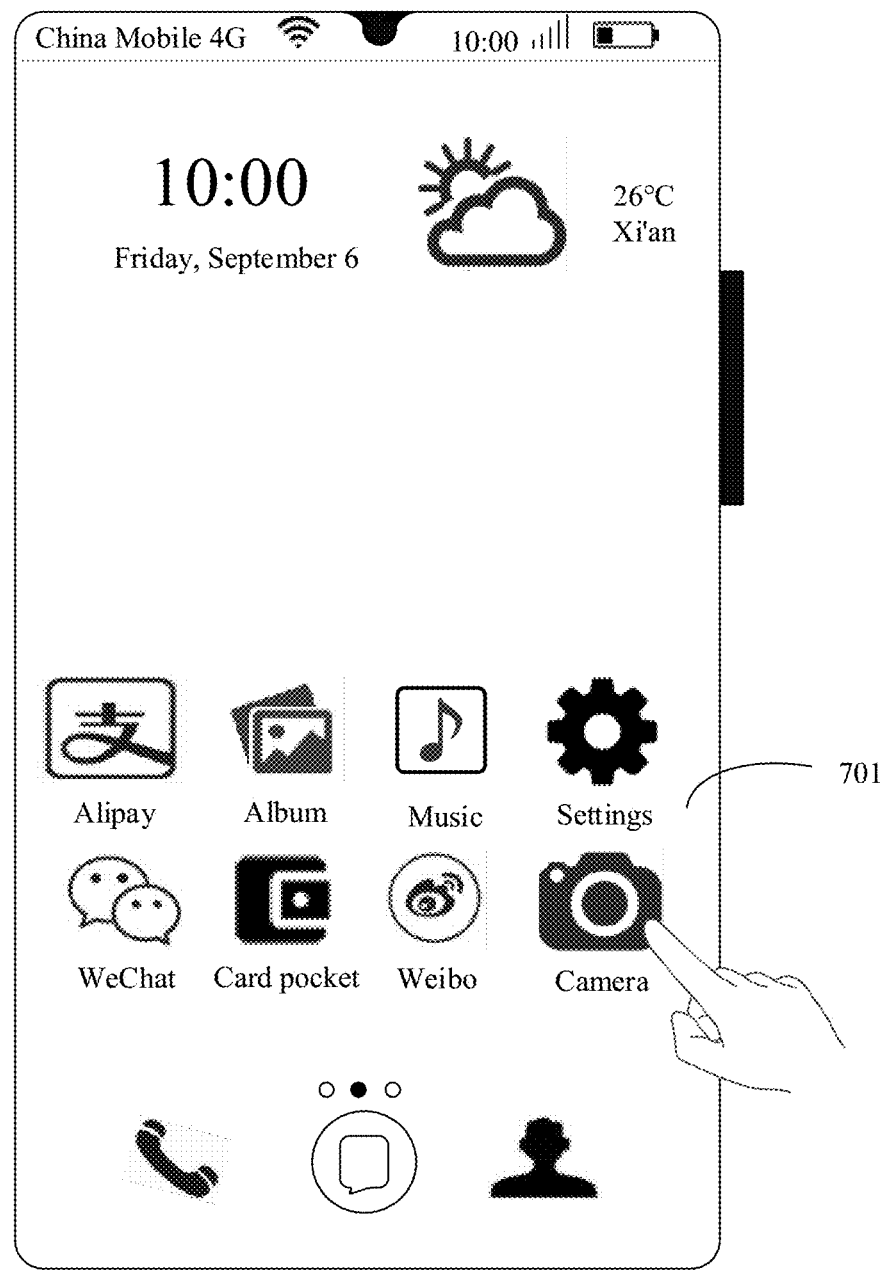
FIG. 7(a), FIG. 7(b), FIG. 7(c), FIG. 7(d), and FIG. 7(e) are a schematic diagram of a graphical user interface of a fourth electronic device according to an embodiment of this application.
Figure 7B:
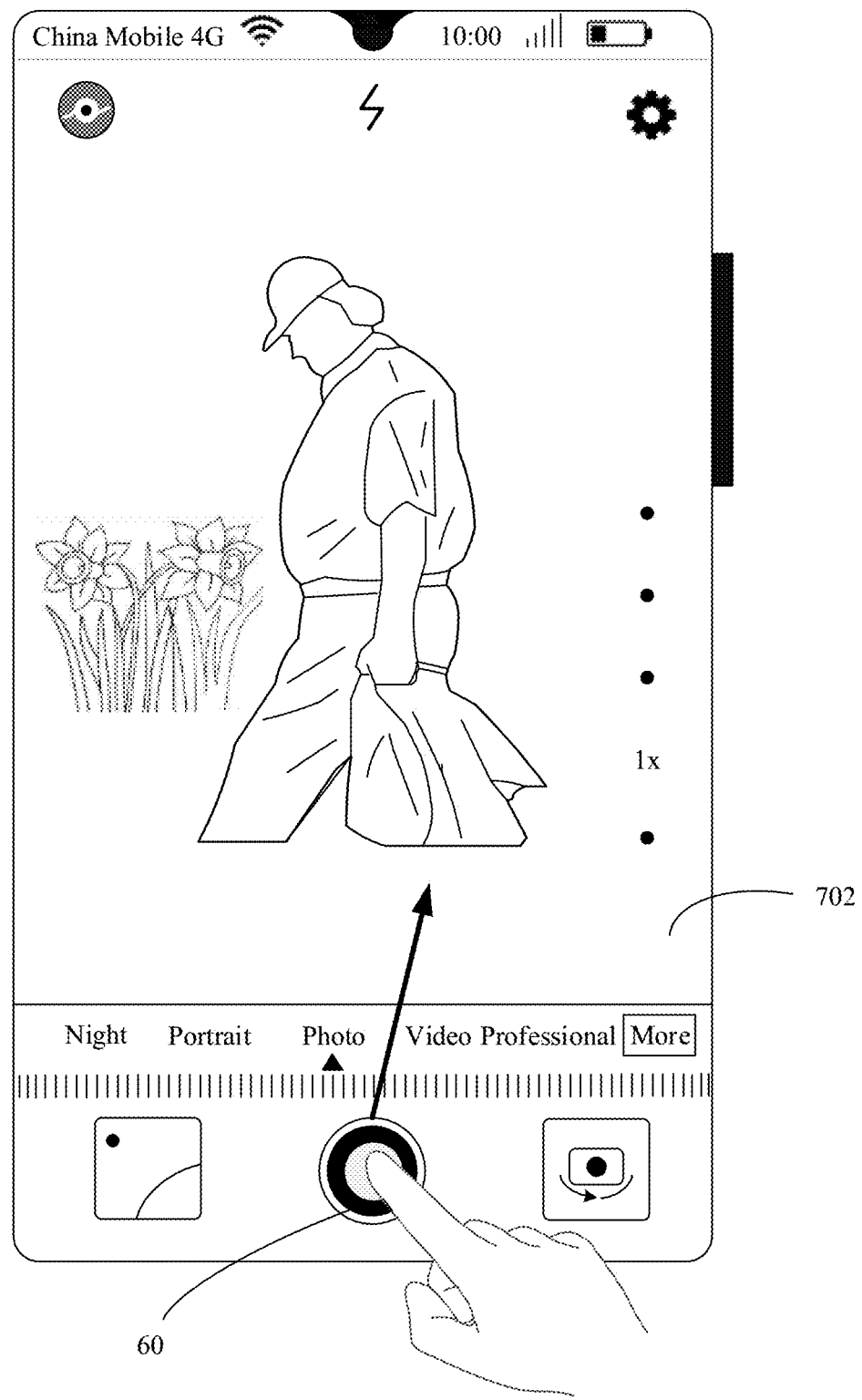
Figure 7C:
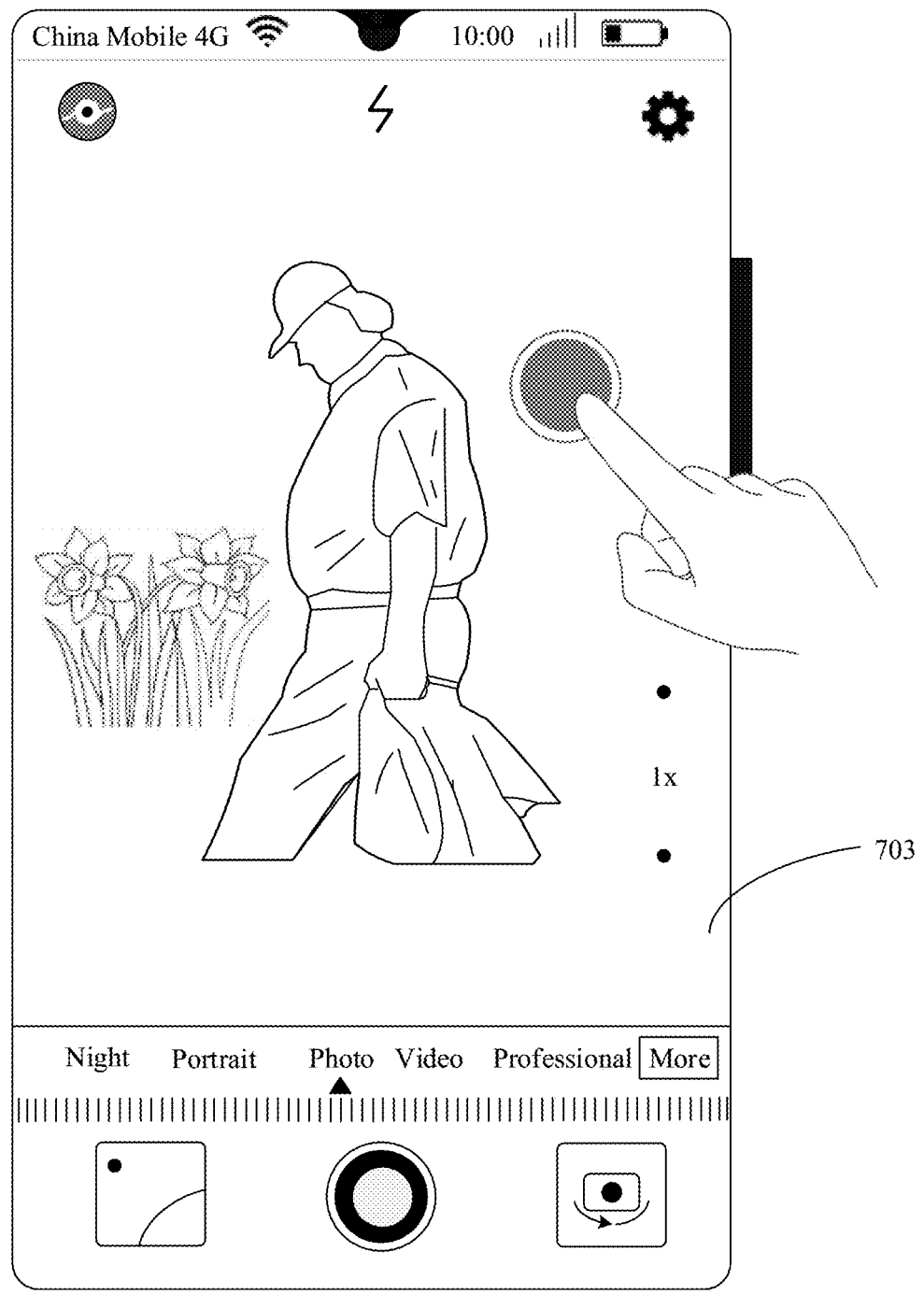
Figure 7D:
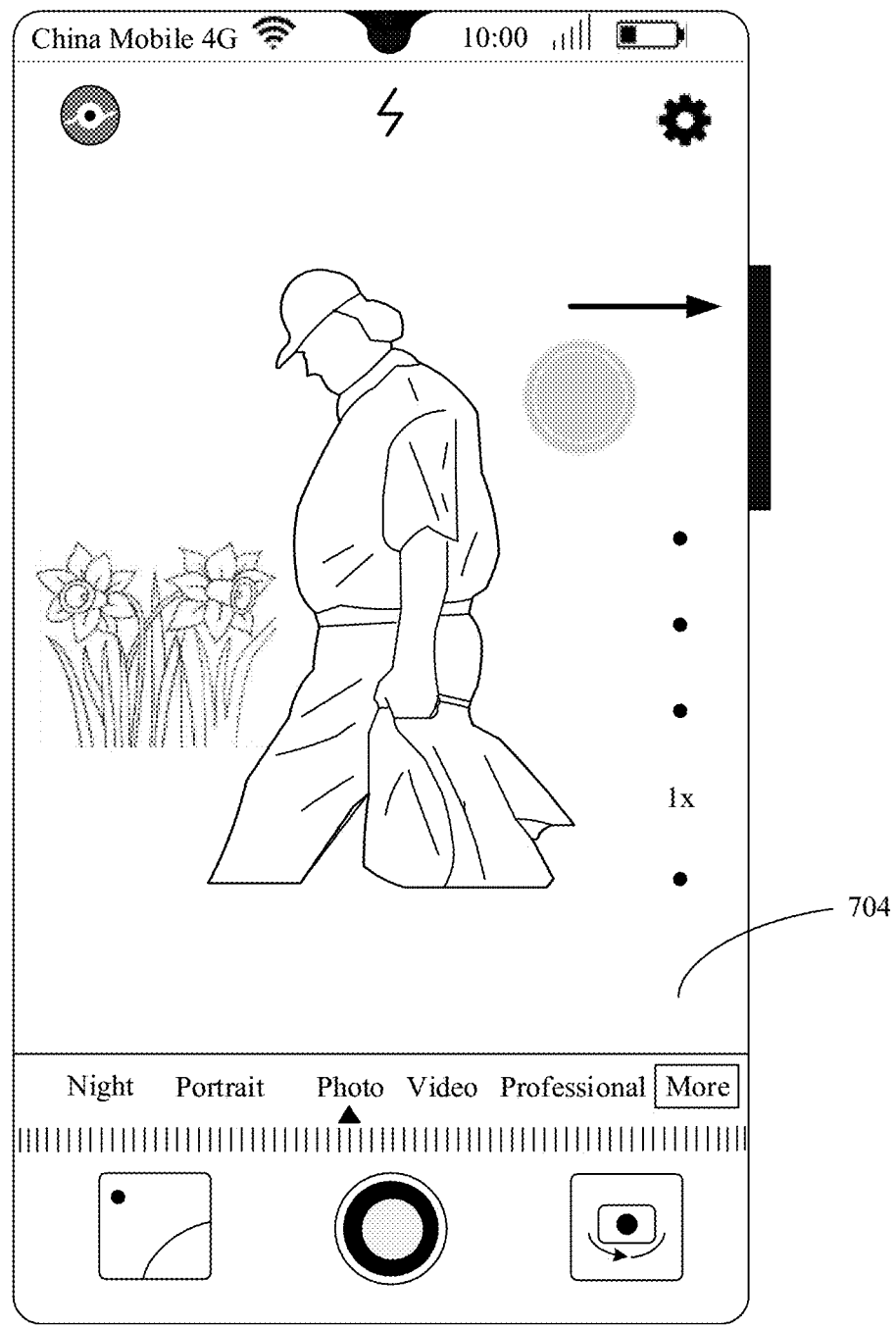
Figure 7E:
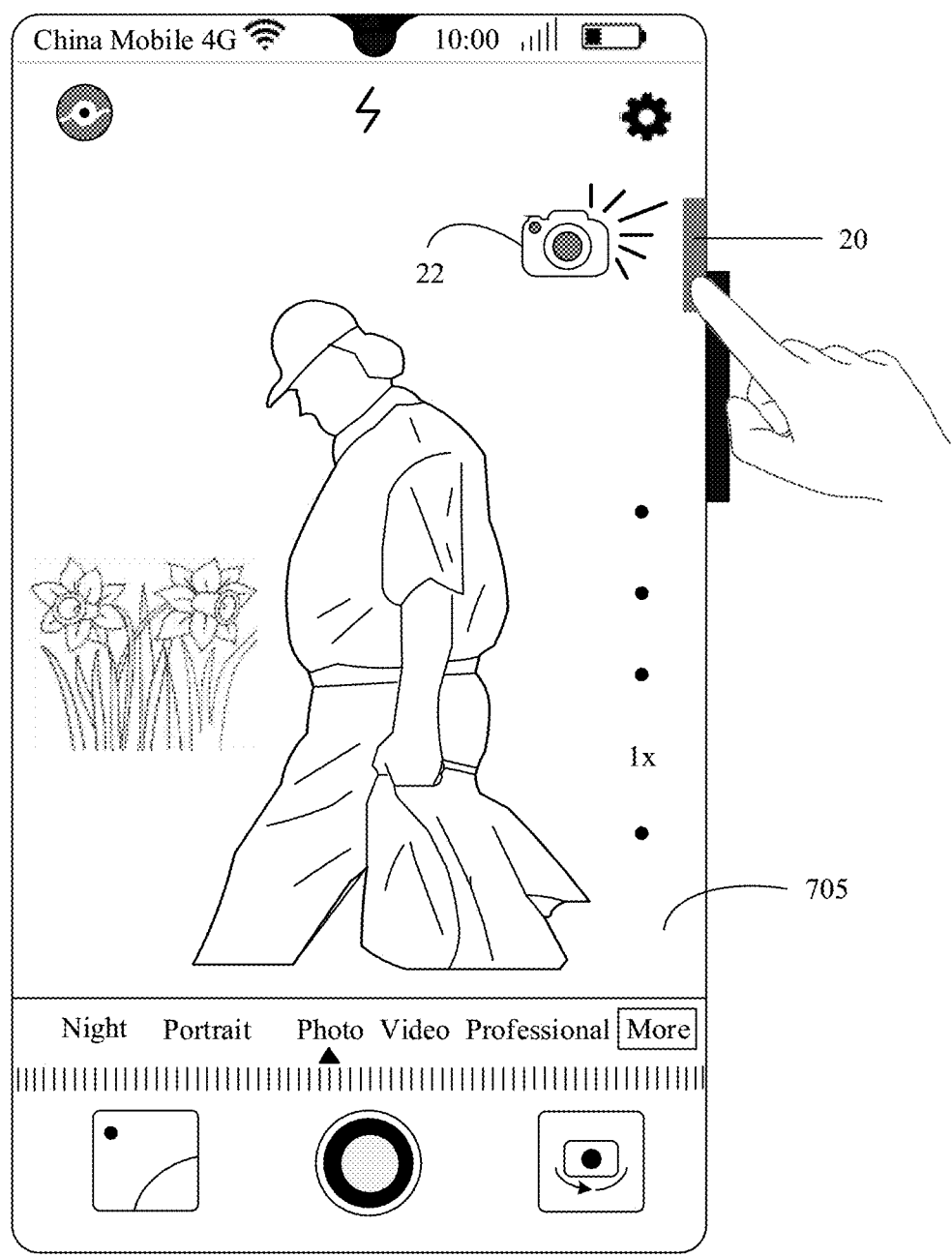

For example, the fifth input may be a touch, select, and move operation performed by the user on the shutter button. As shown in FIG. 7(b), after touching and selecting the shutter button 60, and holding the shutter button 60 for specific duration (for example, 2 seconds), the user moves the shutter button 60 from a display position of the shutter button 60 to another position, and in response to the touch, select, and move operation performed by the user, as shown in FIG. 7(c), the mobile phone generates a virtual shutter button 20 in a same shape as the shutter button on the photographing preview interface.

In an embodiment, indication information may be displayed on the photographing preview interface, and the indication information is used to indicate a function or a position of the second button.

In an embodiment, as shown in FIG. 4(c), FIG. 4(d), and FIG. 4(e), the indication information may be displayed on the photographing preview interface in a form of an icon, a control, or text information. Alternatively, the indication information may be displayed in a notification bar in a form of text information, and the user may view the indication information by performing a pull-down operation.

For example, as shown in FIG. 4(c), the indication information may be displayed on the photographing preview interface in the form of an icon. For example, a control may be presented as an icon in a small triangle shape. When the mobile phone enters the camera application, a reminder control in the small triangle shape is presented on the photographing preview interface. The reminder control may be automatically displayed for specific duration, for example, 5 seconds, after the photographing preview interface is entered. Alternatively, the reminder control may be continuously dynamically displayed, for example, dynamically moves towards the virtual shutter button, for example, moves towards the virtual shutter button for 5 seconds, to remind the user that photographing or video recording may be performed by tapping the virtual shutter button.

Alternatively, for example, as shown in FIG. 4(d), a control may be presented as an icon in a camera shape. When the mobile phone enters the camera application, a reminder control in the camera shape is presented on the photographing preview interface. The reminder control may be automatically displayed for specific duration, for example, 5 seconds, after the photographing preview interface is entered. Alternatively, the reminder control may dynamically flash for display, for example, dynamically flash for specific duration or a specific quantity of times. For example, the reminder control flashes for 5 seconds for display or flashes for three times, to remind the user that photographing or video recording may be performed by tapping the virtual shutter button. This is not limited in this application.

Alternatively, as shown in FIG. 4(d), the indication information may be displayed on the photographing preview interface in the form of text information. For example, the indication information may include text content, for example, "photo". When the mobile phone enters the camera application, a text reminder box is displayed on the photographing preview interface. The text reminder box may be automatically displayed for specific duration, for example, 5 seconds, after the photographing preview interface is entered. Alternatively, the text reminder box 23 may flash for display, for example, flash for 5 seconds for display or flash for three times, to remind the user that photographing or video recording may be performed by tapping the virtual shutter button.

In an embodiment, a display screen of the electronic device is a curved screen, and the edge region of the first photographing preview interface is a curved bending region of the curved screen.

It should be understood that the method may be applied to various types of electronic devices. For example, the method may be applied to an electronic device whose display screen is of a relatively large screen size, for example, a foldable electronic device or an electronic device with a curved screen. When a display screen of the foldable electronic device is expanded, the user faces the display screen with a relatively large screen size, and may complete a photographing operation based on the method provided in this application, by using the virtual shutter button, and by dragging the virtual shutter button to a position convenient for an operation. When the electronic device is a foldable electronic device and in a folded state, when the user takes a selfie, the virtual shutter button may be displayed on a side screen of the foldable electronic device, and the virtual shutter button may be displayed without occupying the photographing preview interface. In an embodiment, the virtual shutter button may be displayed, based on dragging by the user, in a display region, namely, the photographing preview interface, currently used by the user or the edge region of the photographing preview interface, to improve photographing experience of the user. In this way, different photographing requirements of the user can be met, thereby improving photographing experience of the user.

Alternatively, the method may be applied to an electronic device with a curved screen. For the electronic device with a curved screen, the virtual shutter button provided in this application may be located in a curved side region of the curved screen. In this case, for the user, the virtual shutter button is displayed by occupying only the curved side region of the electronic device with a curved screen, and therefore a better image preview effect can be provided for the user. In an embodiment, based on a use habit of the user, the virtual shutter button may be displayed at different positions when being dragged by the user, to improve photographing experience of the user. In this way, different photographing requirements of the user can be met, thereby improving photographing experience of the user.

It may be understood that, to implement the foregoing functions, the electronic device includes corresponding hardware and/or software modules for performing the functions. With reference to algorithm operations of each example described in the embodiments disclosed in this specification, this application may be implemented in a form of hardware or a combination of hardware and computer software. Whether a function is performed by hardware or hardware driven by computer software depends on particular applications and design constraint conditions of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that, in the embodiments, division into modules is an example, and is merely logical function division. During actual implementation, there may be another division manner.

When function modules are obtained through division by using corresponding functions, FIG. 12 is a schematic diagram of composition of an electronic device for performing a photographing method according to an embodiment of this application. As shown in FIG. 12, the electronic device 1200 may include a display unit 1201, a detection unit 1202, and a processing unit 1203.

The display unit 1201, the detection unit 1202, and the processing unit 1203 cooperate with each other, and may be configured to support the electronic device 1200 in performing the operations and the like described in FIG. 11, and/or used for another process of the technology described in this specification.

It should be noted that all related content of the operations in the foregoing method embodiments may be cited in function descriptions of corresponding function modules. Details are not described herein again.

The electronic device provided in this embodiment is configured to perform the photographing method, and therefore effects the same as those of the foregoing implementation method can be achieved.

When an integrated unit is used, the electronic device may include a processing module, a storage module, and a communications module. The processing module may be configured to control and manage actions of the electronic device, for example, may be configured to support the electronic device in performing the operations performed by the display unit 1201, the detection unit 1202, and the processing unit 1203. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. The processor may alternatively be a combination, for example, a combination including one or more microprocessors or a combination of a digital signal processor (DSP) and a microprocessor, for implementing a computing function. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device with the structure shown in FIG. 1.

An embodiment further provides a computer storage medium. The computer storage medium stores computer instructions; and when the computer instructions are run on an electronic device, the electronic device is enabled to perform the foregoing related method operations, to implement the photographing method in the foregoing embodiments.

An embodiment further provides a computer program product. When the computer program product is run on a computer, the computer is enabled to perform the foregoing related operations, to implement the photographing method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the photographing method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented based on requirements, in other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed on different places. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A photographing method, applied to an electronic device, wherein the method comprises:
    displaying a first photographing preview interface, wherein the first photographing preview interface comprises a first button and a second button, both the first button and the second button are to trigger a photographing operation, wherein the first button is displayed at a first preset position of the first photographing preview interface in a first shape, wherein the second button is displayed in a second shape at a second position located in an edge region of the first photographing preview interface, wherein the second shape is different from the first shape, wherein a display screen of the electronic device is a foldable screen, and wherein the edge region of the first photographing preview interface is a bending region of the foldable screen; and
    performing the photographing operation in response to a first input that acts on the second button.

2. The method according to claim 1, wherein the method further comprises:
    displaying a second photographing preview interface, wherein the second photographing preview interface comprises the first button and the second button, wherein the second button is displayed in a third shape at a third position located in a middle region of the second photographing preview interface; and
    moving the second button from the third position to the second position in response to a second input that acts on the second button.

3. The method according to claim 2, wherein the third shape is the same as the first shape of the first button.

4. The method according to claim 1, wherein the second shape is a long strip shape.

5. The method according to claim 2, wherein when the second button is displayed at the second position, the second button is moved from the second position to a fourth position in response to a third input that acts on the second button, wherein
    when the fourth position is located in the edge region of the first photographing preview interface, the second button is in the second shape; or
    when the fourth position is located in the middle region of the second photographing preview interface, the second button is in the third shape.

6. The method according to claim 1, wherein the method further comprises:
    displaying a third photographing preview interface in response to a fourth input that acts on the second button, wherein the third photographing preview interface does not comprise the second button.

7. The method according to claim 1, wherein before the displaying of the first photographing preview interface, the method further comprises:
    displaying a third photographing preview interface, wherein the third photographing preview interface comprises the first button and does not comprise the second button; and
    displaying the second button on the third photographing preview interface in response to a fifth input.

8. The method according to claim 7, wherein the fifth input acts on the second button.

9. The method according to claim 1, wherein the method further comprises:
    displaying indication information, wherein the indication information is to indicate a function or a position of the second button.

10. An electronic device, comprising:
    one or more processors;
    a memory; and
    one or more programs;
    wherein the one or more programs are stored in the memory, and when the one or more programs are executed by the processor, the electronic device is enabled to perform the following operations:
    displaying a first photographing preview interface, wherein the first photographing preview interface comprises a first button and a second button, both the first button and the second button are to trigger a photographing operation, wherein the first button is displayed at a first preset position of the first photographing preview interface in a first shape, wherein the second button is displayed in a second shape at a second position located in an edge region of the first photographing preview interface, wherein the second shape is different from the first shape, wherein a display screen of the electronic device is a foldable screen, and wherein the edge region of the first photographing preview interface is a bending region of the foldable screen; and performing the photographing operation in response to a first input that acts on the second button.

11. The electronic device according to claim 10, wherein when the one or more programs are executed by the processors, the electronic device is enabled to perform the following operations:

displaying a second photographing preview interface, wherein the second photographing preview interface comprises the first button and the second button, wherein the second button is displayed in a third shape at a third position located in a middle region of the second photographing preview interface; and moving the second button from the third position to the second position in response to a second input that acts on the second button.

12. The electronic device according to claim 11, wherein the third shape is the same as the first shape of the first button.

13. The electronic device according to claim 10, wherein the second shape is a long strip shape.

14. The electronic device according to claim 11, wherein when the one or more programs are executed by the processor, the electronic device is enabled to perform the following step:

when the second button is displayed at the second position, moving the second button from the second position to a fourth position in response to a third input that acts on the second button, wherein when the fourth position is located in the edge region of the first photographing preview interface, the second button is in the second shape; or when the fourth position is located in the middle region of the second photographing preview interface, the second button is in the third shape.

15. The electronic device according to claim 10, wherein when the one or more programs are executed by the processor, the electronic device is enabled to perform the following step:

displaying a third photographing preview interface in response to a fourth input that acts on the second button, wherein the third photographing preview interface does not comprise the second button.

16. The electronic device according to claim 10, wherein when the one or more programs are executed by the processors, the electronic device is enabled to perform the following operations:

before displaying the first photographing preview interface, the electronic device is further configured to display a third photographing preview interface, wherein the third photographing preview interface comprises the first button and does not comprise the second button; and displaying the second button on the third photographing preview interface in response to a fifth input.

17. The electronic device according to claim 16, wherein the fifth input acts on the second button.

18. The electronic device according to claim 10, wherein when the one or more programs are executed by the processors, the electronic device is enabled to perform the following step:

displaying indication information, wherein the indication information is to indicate a function or a position of the second button.

* * * * *